US010008336B2

(12) United States Patent
Kitsuda et al.

(10) Patent No.: US 10,008,336 B2
(45) Date of Patent: Jun. 26, 2018

(54) DYE-SENSITIZED SOLAR CELL ELEMENT

(71) Applicant: FUJIKURA LTD., Tokyo (JP)

(72) Inventors: Mami Kitsuda, Chiba (JP); Daisuke Matsumoto, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days. days.

(21) Appl. No.: 14/908,804

(22) PCT Filed: Jul. 31, 2014

(86) PCT No.: PCT/JP2014/070253
§ 371 (c)(1),
(2) Date: Jan. 29, 2016

(87) PCT Pub. No.: WO2015/016321
PCT Pub. Date: Feb. 5, 2015

(65) Prior Publication Data
US 2016/0189877 A1 Jun. 30, 2016

(30) Foreign Application Priority Data
Jul. 31, 2013 (JP) .................................. 2013-159731

(51) Int. Cl.
*H01G 9/20* (2006.01)
(52) U.S. Cl.
CPC ........... *H01G 9/209* (2013.01); *H01G 9/2027* (2013.01); *H01G 9/2077* (2013.01);
(Continued)
(58) Field of Classification Search
CPC ...... H01G 9/20; H01G 9/2009; H01G 9/2022; H01G 9/2027; H01G 9/2031;
(Continued)

(56) References Cited

U.S. PATENT DOCUMENTS

2005/0014307 A1* 1/2005 Shiraishi ........... H01L 27/14618
438/60
2007/0170458 A1* 7/2007 Mitani ................... H01L 33/505
257/103
(Continued)

FOREIGN PATENT DOCUMENTS

EP       2 387 080 A2    11/2011
JP       61-241982 A     10/1986
(Continued)

OTHER PUBLICATIONS

International Search Report of PCT/JP2014/070253 filed Aug. 26, 2014.
(Continued)

*Primary Examiner* — Bethany L Martin
(74) *Attorney, Agent, or Firm* — Sughrue Mion, PLLC

(57) ABSTRACT

A dye-sensitized solar cell (DSC) element includes at least one DSC. The DSC includes a first base material having a transparent substrate, a second base material facing the first base material, an oxide semiconductor layer provided between the first and second base materials, and a sealing portion connecting the first and second base materials. One transparent substrate is provided for the at least one DSC, and a coating layer covering a light receiving surface, which is opposite to the second base material, of the transparent substrate and transmitting light is provided on the first base material. The coating layer includes an annular peripheral portion, and a center portion provided at the inner side of the peripheral portion. An average thickness of the peripheral portion is smaller than a maximum thickness of the center portion, and the coating layer has a refractive index higher than that of the transparent substrate.

4 Claims, 20 Drawing Sheets

(52) U.S. Cl.
CPC ......... *H01G 9/2031* (2013.01); *H01G 9/2059* (2013.01); *Y02E 10/542* (2013.01)

(58) Field of Classification Search
CPC .. H01G 9/2068; H01G 9/2077; H01G 9/2081; H01G 9/2095
See application file for complete search history.

(56) References Cited

U.S. PATENT DOCUMENTS

| | | | | |
|---|---|---|---|---|
| 2009/0272433 | A1* | 11/2009 | Morooka | H01G 9/2031 136/256 |
| 2011/0114166 | A1* | 5/2011 | Chang | H01G 9/2077 136/256 |
| 2011/0134638 | A1* | 6/2011 | Wang | F21V 7/0008 362/247 |
| 2012/0240975 | A1 | 9/2012 | Ono | |
| 2012/0241891 | A1* | 9/2012 | Maryfield | H01L 31/0232 257/432 |
| 2012/0327511 | A1* | 12/2012 | Murakami | G02B 1/105 359/483.01 |
| 2013/0019947 | A1* | 1/2013 | Ejima | H01G 9/2077 136/259 |
| 2013/0074926 | A1* | 3/2013 | Pei | H01L 31/02327 136/257 |

FOREIGN PATENT DOCUMENTS

| | | |
|---|---|---|
| JP | 2011-238472 A | 11/2011 |
| JP | 2012-204178 A | 10/2012 |
| JP | 2013-143334 A | 7/2013 |

OTHER PUBLICATIONS

Communication dated Apr. 21, 2017, from the State Intellectual Property Office of the P.R.C., in counterpart Chinese application No. 201480034339.1.

Soochang Choi et al., "Development of a high-efficiency laminated dye-sensitized solar cell with a condenser lens", Optics Express, Optical Society of America, Jul. 4, 2011, vol. 19, No. S4, XP008182122, pp. A818-A823 (total 6 pages).

Chi-Hui Chien et al., "Enhanced Light Harvesting in Dye-Sensitized Solar Cell Using External Lightguide", International Journal of Photoenergy, 2011, vol. 2011, Article ID 261828, pp. 1-6 (total 7 pages).

Communication dated Feb. 24, 2017 from the European Patent Office in counterpart Application No. 14831498.2.

* cited by examiner

DYE-SENSITIZED SOLAR CELL ELEMENT

CROSS REFERENCE TO RELATED APPLICATIONS

This is a National Stage of International Application No. PCT/JP2014/070253 filed Jul. 31, 2014, claiming priority based on Japanese Patent Application No. 2013-159731 filed Jul. 31, 2013, the contents of all of which are incorporated herein by reference in their entirety.

TECHNICAL FIELD

The present invention relates to a dye-sensitized solar cell element.

BACKGROUND ART

A dye-sensitized solar cell element has attracted attention as a photoelectric conversion element since it is inexpensive and high photoelectric conversion efficiency is obtained therefrom, and various developments have been conducted with regard to the dye-sensitized solar cell element.

The dye-sensitized solar cell element includes at least one dye-sensitized solar cell, and the dye-sensitized solar cell includes a conductive substrate having a transparent substrate, a counter substrate such as a counter electrode, an annular sealing portion connecting the conductive substrate and the counter substrate, and an oxide semiconductor layer disposed between the conductive substrate and the counter substrate. In the dye-sensitized solar cell element, conversion efficiency can be enhanced by allowing light as much as possible to reach the oxide semiconductor layer through the transparent substrate.

As such a dye-sensitized solar cell element, for example, a dye-sensitized solar cell element described in the following Patent Document 1 is known. Patent Document 1 discloses a dye-sensitized solar cell module in which a light collecting member is disposed on a surface of a transparent substrate opposite to an oxide semiconductor layer (hereinafter, referred to as a "light receiving surface").

CITATION LIST

Patent Document

Patent Document 1: JP 2011-238472 A

SUMMARY OF THE INVENTION

Problem to be Solved by the Invention

However, the dye-sensitized solar cell module described in the above Patent Document 1 has problems described below.

That is, in the dye-sensitized solar cell module described in the above Patent Document 1, in a case where light is obliquely incident on the light receiving surface of the transparent substrate, photoelectric conversion characteristics may not be sufficient in some cases, as compared to a case where light is vertically incident on the light receiving surface. That is, a difference in photoelectric conversion characteristics occurs depending on an incident angle of light. For this reason, when the dye-sensitized solar cell element module is installed, it is necessary to strictly adjust an angle of incident light and thus the installation operation is extremely inconvenient.

The invention is made in view of the above circumstances, and an object thereof is to provide a dye-sensitized solar cell element capable of sufficiently decreasing dependence on light incident angle of photoelectric conversion characteristics.

Means for Solving Problem

The present inventors have conducted thorough studies in order to solve the above-described problems, and as a result, they found that the above-described problems can be solved by the following inventions.

That is, the invention is a dye-sensitized solar cell element including at least one dye-sensitized solar cell, the dye-sensitized solar cell including: a first base material having a transparent substrate; a second base material facing the first base material; an oxide semiconductor layer provided between the first base material and the second base material; and an annular sealing portion connecting the first base material and the second base material, one transparent substrate being provided for the at least one dye-sensitized solar cell, a coating layer being provided on the first base material, the coating layer being capable of covering a light receiving surface, which is opposite to the second base material, of the transparent substrate and transmitting light, and the coating layer including: an annular peripheral portion; and a center portion provided at the inner side of the peripheral portion, in which an average thickness of the peripheral portion is smaller than a maximum thickness of the center portion, the coating layer has a refractive index higher than a refractive index of the transparent substrate, and the peripheral portion of the coating layer is, in a case where the dye-sensitized solar cell element has one dye-sensitized solar cell, when it is assumed that an inner circumferential surface of the annular sealing portion extends to pass over the coating layer along a thickness direction of the sealing portion, a portion at the outer side of the inner circumferential surface of the extended sealing portion, in a case where the dye-sensitized solar cell element has a plurality of the dye-sensitized solar cells and the sealing portions of the adjacent dye-sensitized solar cells are integrated with each other, when it is assumed that an inner circumferential surface of an annular portion at the outer side of the integrated sealing portion extends to pass over the coating layer along the thickness direction of the sealing portion, a portion at the outer side of the inner circumferential surface of the extended annular portion, and in a case where the dye-sensitized solar cell element has a plurality of the dye-sensitized solar cells and the sealing portions of the adjacent dye-sensitized solar cells are separated from each other, when an annular portion formed by combining portions facing the outer side of the sealing portion of each of the dye-sensitized solar cells with each other is assumed and it is assumed that an inner circumferential surface of the annular portion extends to pass over the coating layer along the thickness direction of the sealing portion, a portion at the outer side of the inner circumferential surface of the extended annular portion.

According to this dye-sensitized solar cell element, it is possible to sufficiently decrease dependence on light incident angle of photoelectric conversion characteristics.

In the dye-sensitized solar cell element, it is preferable that the light receiving surface of the transparent substrate be convex toward a side opposite to the coating layer.

In this case, light having a wider incident angle can be collected by refraction of incident light in an interface between the transparent substrate and the coating layer, as compared with a case where the light receiving surface of the transparent substrate is not convex toward a side opposite to the coating layer.

In the dye-sensitized solar cell element, it is preferable that a peripheral portion of the light receiving surface be curved to be convex toward a side opposite to the coating layer.

In this case, it is possible to more sufficiently perform collection of light even when a shielding material is present in the peripheral portion, as compared with a case where the peripheral portion of the light receiving surface is not curved to be convex toward a side opposite to the coating layer.

In the dye-sensitized solar cell element, it is preferable that the entire transparent substrate be curved to be convex toward a side opposite to the coating layer.

In this case, light passing through the transparent substrate can be further refracted and collected.

In the dye-sensitized solar cell element, it is preferable that the light receiving surface of the transparent substrate be convex toward a side opposite to the coating layer, the peripheral portion of the light receiving surface be curved to be convex toward a side opposite to the coating layer, and a surface, which is opposite to the transparent substrate, of surfaces of the coating layer be a flat surface.

In this case, it is possible to sufficiently decrease dependence on light incident angle of photoelectric conversion characteristics.

Incidentally, the "refractive index" in the invention indicates a refractive index in sodium D line (589 nm).

Further, the "average thickness of the peripheral portion" indicates a value measured using a stylus step profiler.

Furthermore, in the present specification, the "incident angle of light" indicates an incident angle of light incident on a flat surface when the dye-sensitized solar cell element is disposed on the flat surface, with the coating layer disposed to face a side opposite to the flat surface, and the dye-sensitized solar cell element is irradiated with light from a light source.

Effect of the Invention

According to the invention, provided is a dye-sensitized solar cell element capable of sufficiently decreasing dependence on light incident angle of photoelectric conversion characteristics.

MODE(S) FOR CARRYING OUT THE INVENTION

Figure 1:
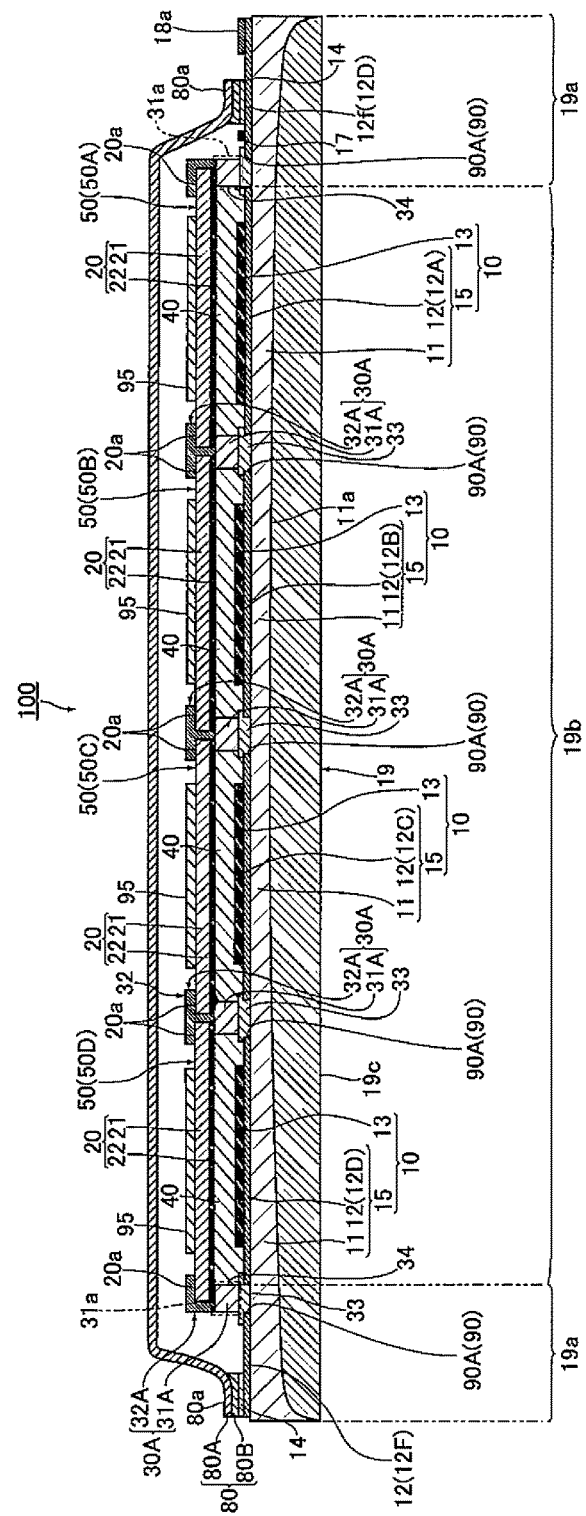
FIG. 1 is an end view of the cross section illustrating a first embodiment of a dye-sensitized solar cell element of the invention.
Figure 2:
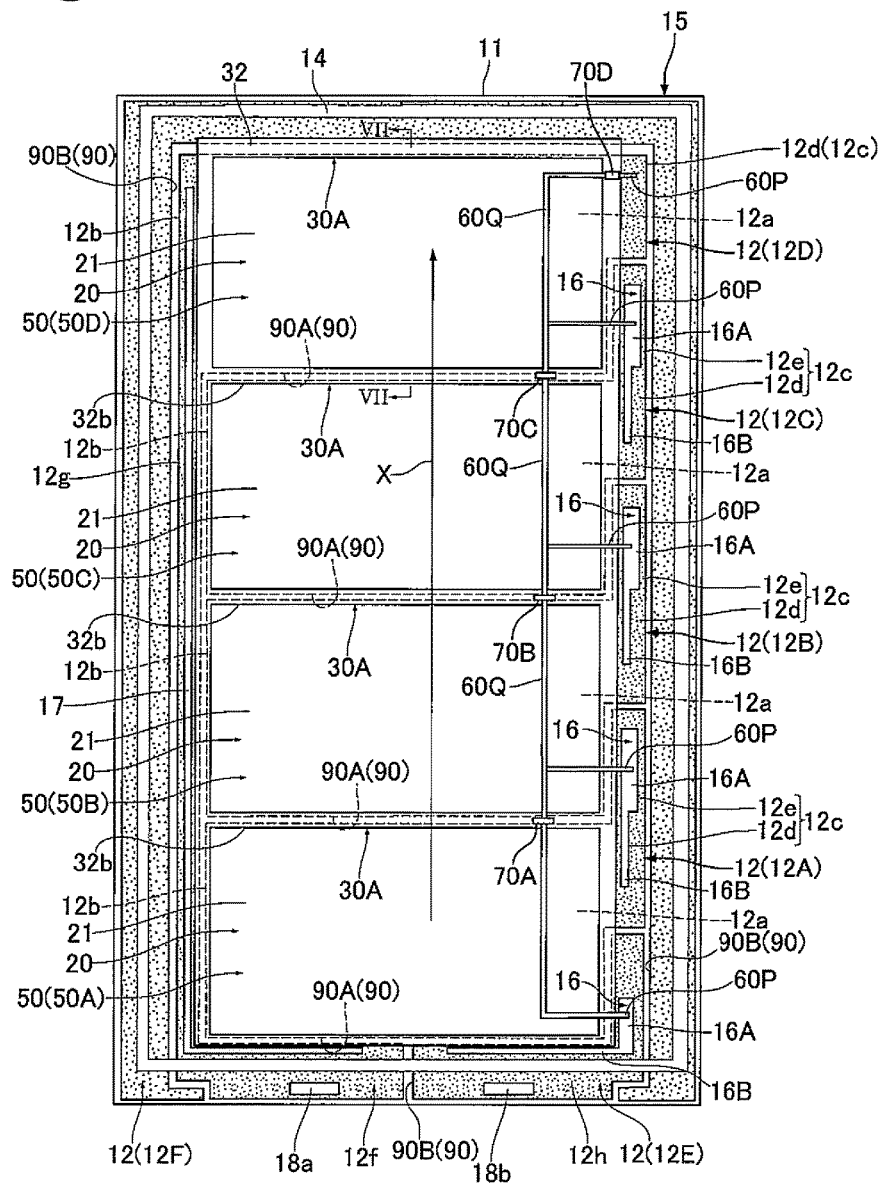
FIG. 2 is a plan view illustrating a part of the first embodiment of the dye-sensitized solar cell element of the invention.
Figure 3:
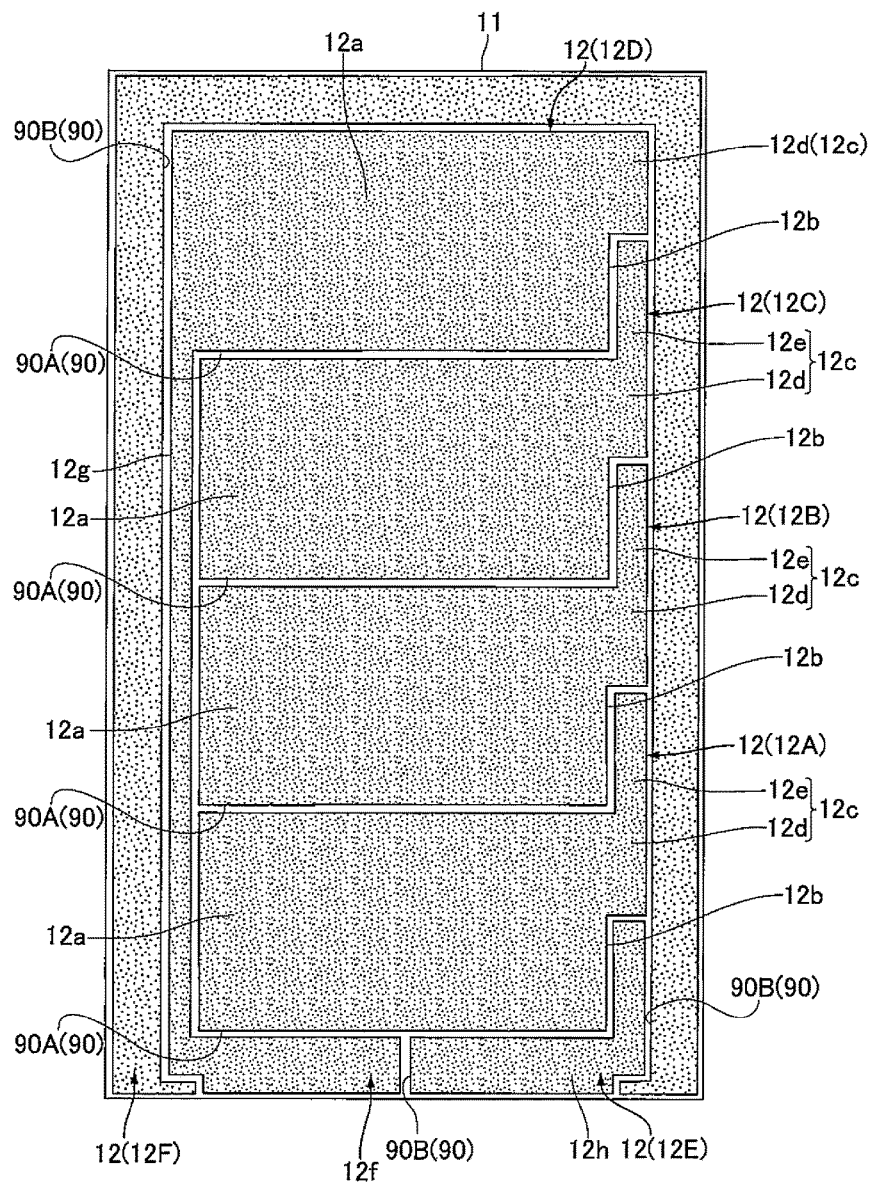
FIG. 3 is a plan view illustrating a pattern of a transparent conductive film in the dye-sensitized solar cell element of FIG. 1.
Figure 4:
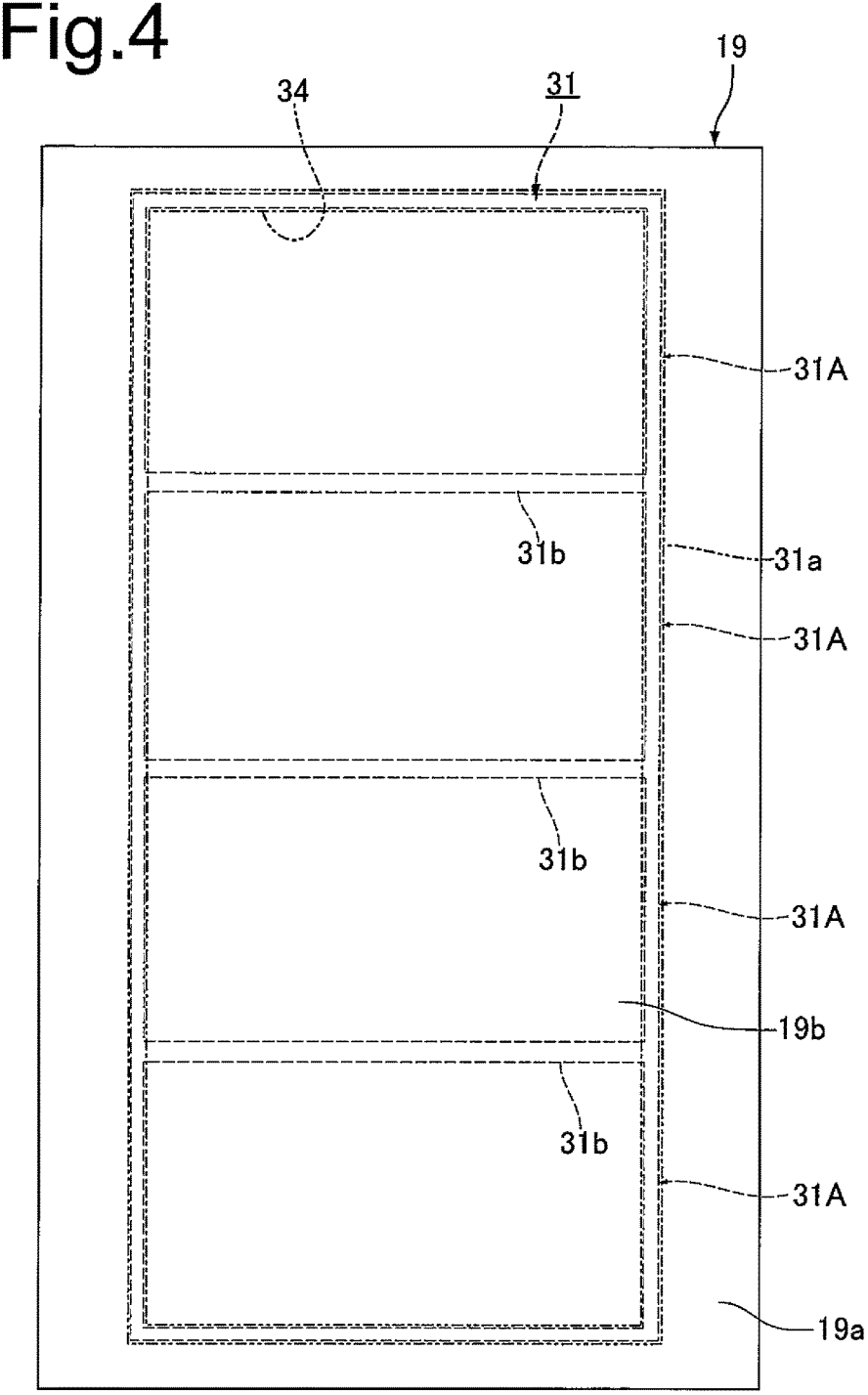
FIG. 4 is a plan view of the dye-sensitized solar cell element of FIG. 1 when viewed from a coating layer.
Figure 5:
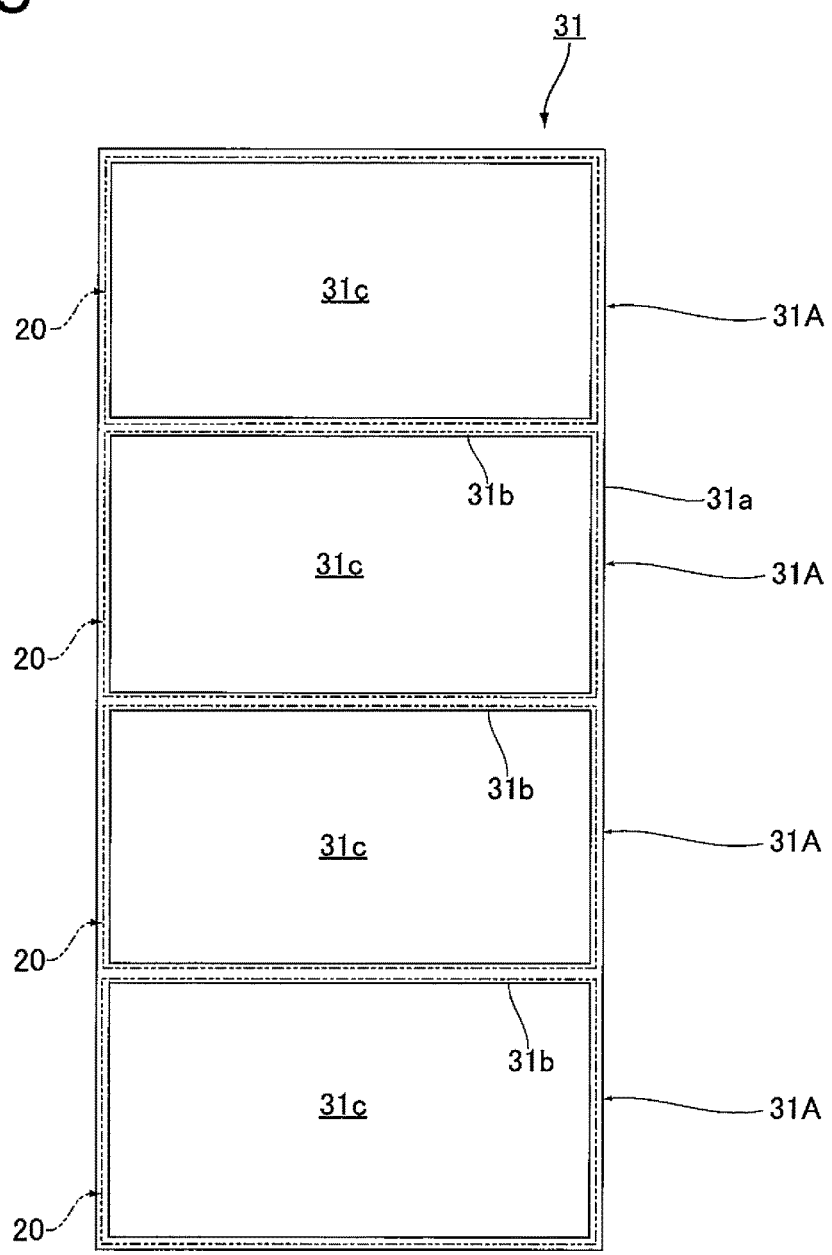
FIG. 5 is a plan view illustrating a first integrated sealing portion of FIG. 1.
Figure 6:
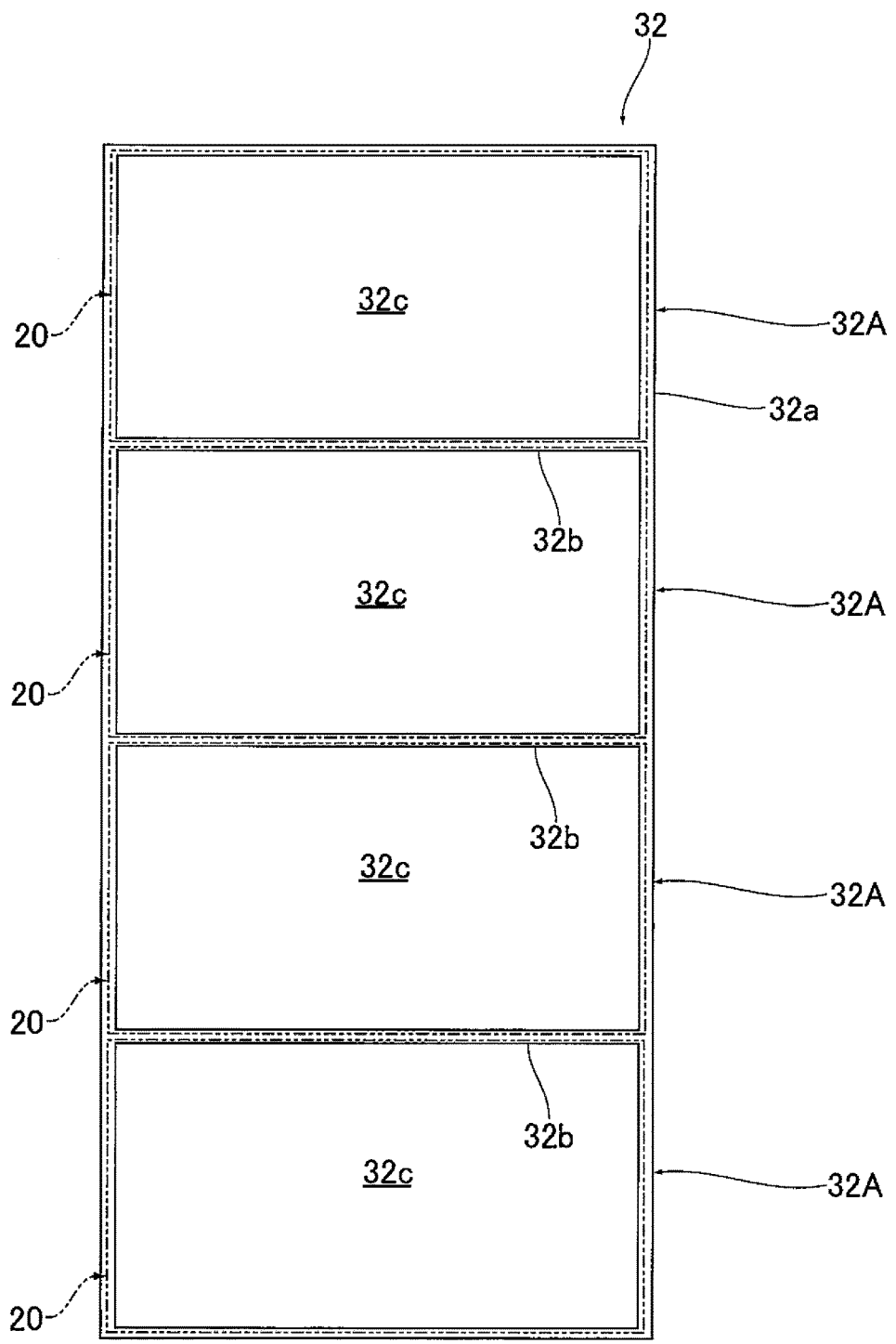
FIG. 6 is a plan view illustrating a second integrated sealing portion of FIG. 1.
Figure 7:
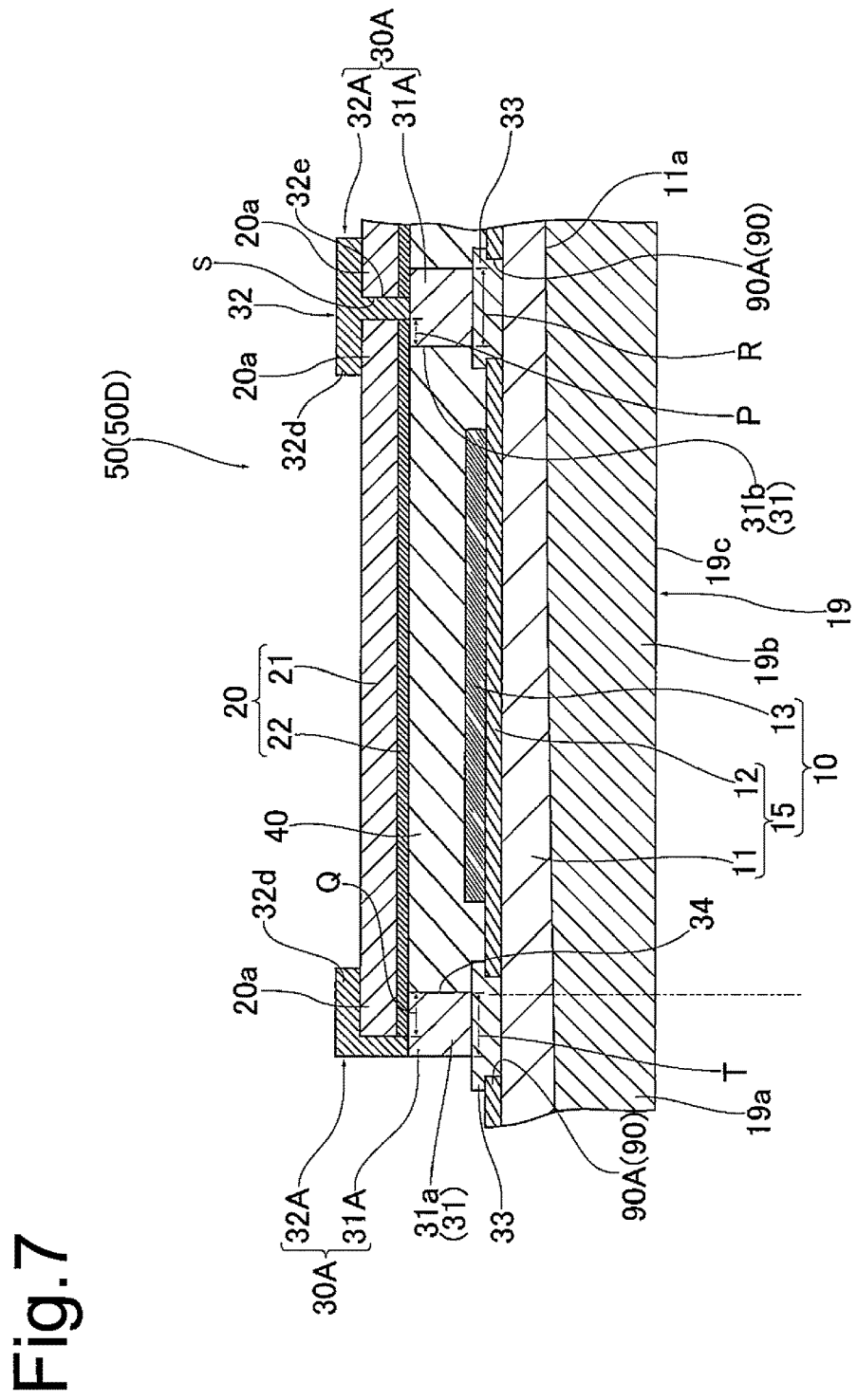
FIG. 7 is an end view of the cross section taken along the line VII-VII of FIG. 2.
Figure 8:
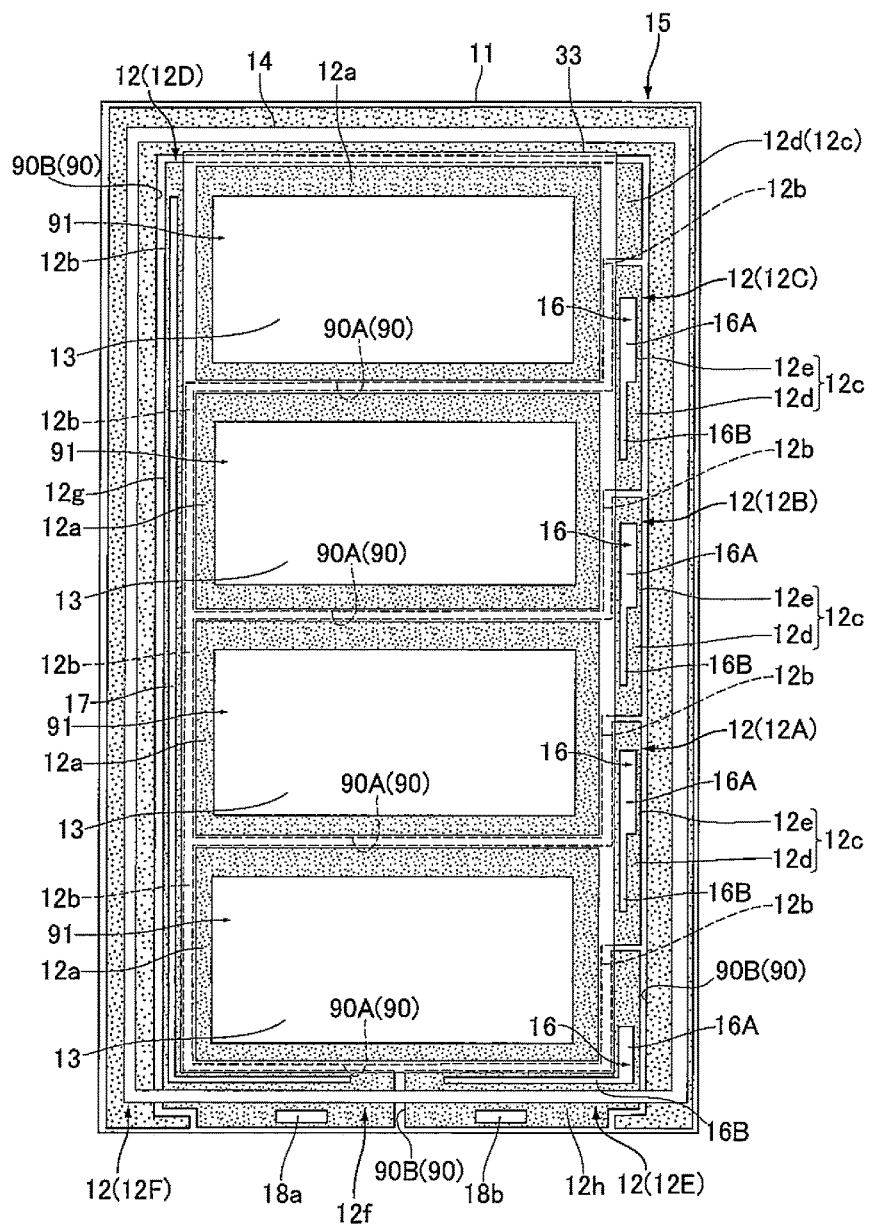
FIG. 8 is a plan view illustrating a working electrode on which a coupling portion is formed for fixing a back sheet.

Hereinafter, preferred embodiments of a dye-sensitized solar cell element of the invention will be described in detail with reference to FIG. 1 to FIG. 8. FIG. 1 is an end view of the cross section illustrating a preferred embodiment of the dye-sensitized solar cell element of the invention, FIG. 2 is a plan view illustrating a part of the preferred embodiment of the dye-sensitized solar cell element of the invention, FIG. 3 is a plan view illustrating a pattern of a transparent conductive film in the dye-sensitized solar cell element of FIG. 1, FIG. 4 is a plan view of the dye-sensitized solar cell element of FIG. 1 when viewed from a coating layer, FIG. 5 is a plan view illustrating a first integrated sealing portion of FIG. 1, FIG. 6 is a plan view illustrating a second integrated sealing portion of FIG. 1, FIG. 7 is an end view of the cross section taken along the line VII-VII of FIG. 2, and FIG. 8 is a plan view illustrating a working electrode on which a coupling portion is formed for fixing a back sheet.

As illustrated in FIG. 1, a dye-sensitized solar cell module (hereinafter, referred to as the "DSC module" in some cases) 100 as a dye-sensitized solar cell element has a plurality (four in FIG. 1) of dye-sensitized solar cells (hereinafter, referred to as the "DSC" in some cases) 50 and a back sheet 80 which is provided so as to cover a portion, which is opposite to the light incident surface, of the DSC 50. As illustrated in FIG. 2, the plurality of DSCs 50 are connected in series by a conductive material 60P. Hereinafter, for convenience of description, the four DSCs 50 of the DSC module 100 are referred to as DSCs 50A to 50D in some cases.

As illustrated in FIG. 1, each of the plurality of DSCs 50 is equipped with a working electrode 10 having the conductive substrate 15, a counter electrode 20 facing the conductive substrate 15, and an annular sealing portion 30A bonding the working electrode 10 and the counter electrode 20. An electrolyte 40 is filled in the cell space formed by the conductive substrate 15, the counter electrode 20, and the annular sealing portion 30A.

The counter electrode 20 is equipped with a metal substrate 21 and a catalyst layer 22 which is provided at the working electrode 10 side of the metal substrate 21 and promotes the catalytic reaction. In addition, in two adjacent DSCs 50, the counter electrodes 20 are spaced apart from each other. Moreover, the counter electrode 20 has flexibility. In the present embodiment, the second base material and the second electrode is constituted by the counter electrode 20.

As illustrated in FIG. 1 and FIG. 2, the working electrode 10 includes the conductive substrate 15 and at least one oxide semiconductor layer 13 provided on the conductive substrate 15. The conductive substrate 15 includes a transparent substrate 11, a transparent conductive film 12 provided on the transparent substrate 11, an insulating material 33 provided on the transparent substrate 11, and a connecting terminal 16 provided on the transparent conductive film 12. The oxide semiconductor layer 13 is disposed at the inner side of the annular sealing portion 30A. The transparent substrate 11 is used as a common transparent substrate for the DSCs 50A to 50D. That is, one transparent substrate 11 is provided for the DSCs 50A to 50D. Incidentally, in the present embodiment, a first base material and a first electrode are constituted by the conductive substrate 15.

As illustrated in FIGS. 2 and 3, the transparent conductive film 12 is configured by transparent conductive films 12A to 12F which are provided in a state of being insulated from each other. Namely, the transparent conductive films 12A to 12F are arranged to interpose a groove 90. Herein, the transparent conductive films 12A to 12D constitute the transparent conductive films 12 of a plurality of DSCs 50A to 50D, respectively. In addition, the transparent conductive film 12E is arranged to be bent along the sealing portion 30A. The transparent conductive film 12F is an annular transparent electrode film 12 for fixing a peripheral edge portion 80a of a back sheet 80 (See FIG. 1).

As illustrated in FIG. 3, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the DSCs 50A to 50D and a facing portion 12e which extends from the projecting portion 12d and faces the main body portion 12a of the adjacent DSC 50D via the groove 90.

In the DSC 50B as well, the protruding portion 12c of the transparent conductive layer 12B has the projecting portion 12d and the facing portion 12e. In addition, in the DSC 50A as well, the protruding portion 12c of the transparent conductive layer 12A has the projecting portion 12d and the facing portion 12e.

Meanwhile, the DSC 50D is connected with the DSC 50C already and there is no other DSC 50 to be connected. For this reason, in the DSC 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 12D further has a first current extracting portion 12f for extracting the current generated in the DSC module 100 to the outside and a connecting portion 12g which connects the first current extracting portion 12f with the main body portion 12a and extends along the side edge portion 12b of the transparent conductive layers 12A to 12C. The first current extracting portion 12f is disposed in the vicinity of the DSC 50A and on the side opposite to the transparent conductive layer 12B with respect to the transparent conductive layer 12A.

On the other hand, the transparent conductive film 12E also includes a second current extracting portion 12h for extracting the current generated by the DSC module 100 to the outside, and the second current extracting portion 12h is arranged in the vicinity of the DSC 50A and on the side opposite to the transparent conductive film 12B with respect to the transparent conductive film 12A. A first current extracting portion 12f and the second current extracting portion 12h are arranged to be adjacent to each other via the groove 90B (90) in the periphery of the DSC 50A. Herein, the groove 90 is configured by a first groove 90A which is formed along an edge portion of the main body portion 12a of the transparent conductive film 12 and a second groove 90B which is formed along an edge portion of a portion of the transparent conductive film 12 excluding the main body portion 12a and intersects the peripheral edge portion 80a of the back sheet 80.

In addition, as illustrated in FIG. 2, connecting terminals 16 are provided on protrusion portions 12c of the transparent conductive films 12A to 12C and the transparent conductive film 12E. Each connecting terminal 16 includes a conductive material connecting portion 16A which is connected to a conductive material 60P and extends along the sealing portion 30A in the outer side of the sealing portion 30A and a conductive material non-connecting portion 16B which extends from the conductive material connecting portion 16A along the sealing portion 30A in the outer side of the sealing portion 30A. In the embodiment, in the transparent conductive films 12A to 12C, at least the conductive material connecting portion 16A of the connecting terminal 16 is provided on the facing portion 12e of the protrusion portion 12c and faces the main body portion 12a of the connected adjacent DSC 50. In the transparent conductive film 12E, the conductive material connecting portion 16A of the connecting terminal 16 faces the main body portion 12a of the connected adjacent DSC 50A. A width of the conductive material non-connecting portion 16B is narrower than that of the conductive material connecting portion 16A. Herein, the width of the conductive material connecting portion 16A and the width of the conductive material non-connecting portion 16B are set to be constant. In addition, the width of the conductive material connecting portion 16A denotes a length in the direction perpendicular to the extending direction of the conductive material connecting portion 16A and the narrowest width in the width of the conductive material connecting portion 16A, and the width of the conductive material non-connecting portion 16B denotes a length in the direction perpendicular to the extending direction of the conductive material non-connecting portion 16B and the narrowest width in the width of the conductive material non-connecting portion 16B.

In addition, the conductive material connecting portion 16A of the connecting terminal 16 provided on the protruding portion 12c of the transparent conductive film 12C of the DSC 50C is connected with the metal substrate 21 of the counter electrode 20 of the adjacent DSC 50D via the conductive material 60P. The conductive material 60P is disposed so as to pass over the sealing portion 30A. In the same manner, the conductive material connecting portion 16A of the connecting terminal 16 of the DSC 50B is connected with the metal substrate 21 of the counter electrode 20 of the adjacent DSC 50C via the conductive material 60P, the conductive material connecting portion 16A of the connecting terminal 16 of the DSC 50A is connected with the metal substrate 21 of the counter electrode 20 of the adjacent DSC 50B via the conductive material 60P, and the conductive material connecting portion 16A of the connecting terminal 16 on the transparent conductive film 12E is connected with the metal substrate 21 of the counter electrode 20 of the adjacent DSC 50A via the conductive material 60P.

In addition, external connecting terminals 18a and 18b are provided on the first current extracting portion 12f and the second current extracting portion 12h, respectively.

Further, as illustrated in FIG. 1, a coating layer 19 capable of covering a light receiving surface 11a, which is opposite to the counter electrode 20, of the transparent substrate 11 and transmitting light is provided on the transparent substrate 11 of the conductive substrate 15. The coating layer 19 includes an annular peripheral portion 19a and a center portion 19b provided at the inner side of the peripheral portion 19a. An average thickness t2 of the peripheral portion 19a is smaller than a maximum thickness t1 of the center portion 19b, and the coating layer 19 has a refractive index higher than a refractive index of the transparent substrate 11. In addition, in the DSC module 100, the entire light receiving surface 11a of the transparent substrate 11 is convex toward a side opposite to the coating layer 19. That is, a concave surface is formed in the transparent substrate 1 by the light receiving surface 11a. Here, a peripheral portion of the light receiving surface 11a is curved to be convex toward a side opposite to the coating layer 19. In addition, in the DSC module 100, the coating layer 19 is provided so as to come into contact with the light receiving surface 11a, and a surface 19c, which is opposite to the transparent substrate 11, of surfaces of the coating layer 19 is a flat surface.

As illustrated in FIG. 1, the sealing portion 30A has an annular first sealing portion 31A provided between the conductive substrate 15 and the counter electrode 20 and a second sealing portion 32A which is provided so as to be superimposed on the first sealing portion 31A and sandwiches an edge portion 20a of the counter electrode 20 together with the first sealing portion 31A. In addition, as illustrated in FIG. 5, the adjacent first sealing portions 31A are integrated so as to constitute a first integrated sealing portion 31. That is to say, the first integrated sealing portion 31 is constituted by an annular-shaped part 31a (hereinafter, referred to as the "annular portion") which is not provided between the two adjacent counter electrodes 20 and a part 31b (hereinafter, referred to as the "partitioning portion") which is provided between the two adjacent counter electrodes 20 and partitions an inner side opening 31c of the annular-shaped part 31a. In addition, as illustrated in FIG. 6, adjacent second sealing portions 32A are integrated between the adjacent counter electrodes 20 so as to constitute a second integrated sealing portion 32. The second integrated sealing portion 32 is constituted by an annular-shaped part 32a (hereinafter, referred to as the "annular portion") which is not provided between the two adjacent counter electrodes 20 and a part 32b (hereinafter, referred to as the "partitioning portion") which is provided between the two adjacent counter electrodes 20 and partitions an inner side opening 32c of the annular-shaped part 32a.

In addition, as illustrated in FIG. 1, between the first sealing portion 31A and the groove 90, an insulating material 33 composed of a glass frit is provided so as to enter into the groove 90 between the adjacent transparent conductive layers 12A to 12F and to spread over the adjacent transparent conductive layers 12. To describe in detail, the insulating material 33 also covers the edge portion of the main body portion 12 forming the first groove 90A as well as enters into the first groove 90A formed along the edge portion of the main body portion 12a of the transparent conductive layer 12 of the groove 90.

As illustrated in FIG. 7, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. Furthermore, the width R of the partitioning portion 31b of the first integrated sealing portion 31 is 100% or more and less than 200% of the width T of the annular portion 31a of the first integrated sealing portion 31.

In addition, the second integrated sealing portion 32 has a main body portion 32d provided on the side opposite to the working electrode 10 of the counter electrode 20 and an adhesive portion 32e provided to pass through a gap S between the adjacent counter electrodes 20. The second integrated sealing portion 32 is adhered to the first integrated sealing portion 31 by the adhesive portion 32e.

As illustrated in FIG. 1, the back sheet 80 is provided on the conductive substrate 15. The back sheet 80 includes a laminate 80A including a weather-resistant layer and a metal layer and an adhesive portion 80B which is provided on the side opposite to the metal layer with respect to the laminate 80A and adheres to the conductive substrate 15 via the coupling portion 14. Here, the adhesive portion 80B is provided in order to make the back sheet 80 adhere to the conductive substrate 15, and as illustrated in FIG. 1, the adhesive portion 80B may be formed on the peripheral portion of the laminate 80A. However, the adhesive portion 80B may be provided on the entire surface of the DSC 50 side of the laminate 80A. The peripheral portion 80a of the back sheet 80 is connected with the transparent conductive layers 12D, 12E, and 12F among the transparent conductive layers 12 by the adhesive portion 80B via the coupling portion 14. Here, the adhesive portion 80B is spaced apart from the sealing portion 30A of the DSC 50. Moreover, the coupling portion 14 is also spaced apart from the sealing portion 30A. Meanwhile, the electrolyte 40 is not filled in the space which is on the inner side than the back sheet 80 and the outer side of the sealing portion 30A.

In addition, as illustrated in FIG. 2, in the transparent conductive layer 12D, a current collecting wiring 17 having a lower resistance than the transparent conductive layer 12D extends so as to pass through the main body portion 12a, the connecting portion 12g, and the current extracting portion 12f. This current collecting wiring 17 is disposed so as not to intersect with the coupling portion 14 of the back sheet 80 with the conductive substrate 15. That is to say, the current collecting wiring 17 is disposed on the inner side than the coupling portion 14.

Meanwhile, as illustrated in FIG. 2, bypass diodes 70A to 70D are connected in parallel with the DSCs 50A to 50D, respectively. Specifically, the bypass diode 70A is fixed on the partitioning portion 32b of the second integrated sealing portion 32 between the DSC 50A and the DSC 50B, the bypass diode 70B is fixed on the partitioning portion 32b of the second integrated sealing portion 32 between the DSC 50B and the DSC 50C, and the bypass diode 70C is fixed on the partitioning portion 32b of the second integrated sealing portion 32 between the DSC 50C and the DSC 50D. The bypass diode 70D is fixed on the sealing portion 30A of the DSC 50D. In addition, the conductive material 60Q is fixed to the metal substrate 21 of the counter electrode 20 so as to pass through the bypass diodes 70A to 70D. Moreover, the conductive material 60P branches out from the conductive materials 60Q between the bypass diodes 70A and 70B, between the bypass diodes 70B and 70C, and between the bypass diodes 70C and 70D, respectively, and is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is also fixed to the metal substrate 21 of the counter electrode 20 of the DSC 50A, and this conductive material 60P connects the bypass diode 70A with the conductive material connecting portion 16A of the connecting terminal 16 on the transparent conductive layer 12E. Moreover, the bypass diode 70D is connected with the transparent conductive layer 12D via the conductive material 60P.

In addition, a desiccant 95 is provided on the counter electrode 20 of each DSC 50.

According to the DSC module 100, since the coating layer 19 includes the annular peripheral portion 19a and the center portion 19b provided at the inner side of the peripheral portion 19a, the average thickness of the peripheral portion 19a is smaller than the maximum thickness of the center portion 19b, and the coating layer 19 has a refractive index higher than a refractive index of the transparent substrate 11, it is possible to sufficiently decrease dependence on light incident angle of photoelectric conversion characteristics.

In addition, in the DSC module 100, the entire light receiving surface 11a of the transparent substrate 11 is convex toward a side opposite to the coating layer 19, and the peripheral portion of the light receiving surface 11a is curved to be convex toward a side opposite to the coating layer 19. Accordingly, light having a wider incident angle can also be collected by refraction of incident light in an interface between the transparent substrate 11 and the coating layer 19, as compared with a case where the light receiving surface 11a of the transparent substrate 11 is not convex toward a side opposite to the coating layer 19.

Further, in the DSC module 100, since the peripheral portion of the light receiving surface 11a is curved to be convex toward a side opposite to the coating layer 19, it is possible to more sufficiently perform collection of light even when a shielding material is present in the peripheral portion, as compared with a case where the peripheral portion of the light receiving surface 11a is not curved to be convex toward a side opposite to the coating layer 19.

Further, in the DSC module 100, since the surface 19c, which is opposite to the transparent substrate 11, of surfaces of the coating layer 19 is a flat surface, it is possible to more sufficiently decrease a difference in photoelectric conversion characteristics due to the incident angle of light.

Furthermore, in the DSC module 100, the groove 90 is formed along the edge portion of the transparent conductive layer 12, and this groove 90 has the first groove 90A formed along the edge portion of the main body portion 12a of the transparent conductive layer 12 disposed on the inner side of the annular sealing portion 30A. Moreover, the insulating material 33 composed of a glass frit enters into the first groove 90A, and also this insulating material 33 covers the edge portion of the main body portion 12a forming the first groove 90A as well. For this reason, even if a crack is formed inside the transparent substrate 11 and at the position downward the groove 90 along the groove 90 and the crack continues to the edge portion of the main body portion 12a, the penetration of moisture, which has passed through the crack, from the outside of the sealing portion 30A is sufficiently suppressed by the insulating material 33. Particularly, in the DSC module 100, the insulating material 33 which covers the edge portion of the main body portion 12a forming the first groove 90A and enters into the first groove 90A is composed of a glass frit. For this reason, the DSC module 100 exhibits a higher sealing performance compared to a case in which the insulating material 33 is a resin. For this reason, according to the DSC module 100, it is possible to exhibit excellent durability.

In addition, in the DSC module 100, the sealing portion 30A and the insulating material 33 are disposed so as to be superimposed on each other. For this reason, it is possible to further increase the area of the part contributing to the power generation when seen from the light receiving surface side of the DSC module 100 compared to a case in which the sealing portion 30A and the insulating material 33 are disposed so as not to be superimposed on each other. For this reason, it is possible to more improve the aperture ratio.

In addition, in the DSC module 100, the first current extracting portion 12f and the second current extracting portion 12h are disposed in the vicinity of the DSC 50A and on the side opposite to the transparent conductive layer 12B with respect to the transparent conductive layer 12A, and the first current extracting portion 12f of the transparent conductive layer 12A and the second current extracting portion 12h of the transparent conductive layer 12E are disposed so as to be adjacent to each other via the groove 90. For this reason, in the DSC module 100, it is possible to dispose the external connecting terminals 18a and 18b to the first current extracting portion 12f and the second current extracting portion 12h, respectively, so as to be adjacent to each other. Hence, it is possible to set the number of connectors for extracting the current from the external connecting terminals 18a and 18b to the outside to one. In other words, the first current extracting portion 12f and the second current extracting portion 12h are disposed to be greatly spaced apart from each other, for example, in a case in which the first current extracting portion 12f is disposed on the side opposite to the transparent conductive layer 12c with respect to the transparent conductive layer 12D, and thus the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the DSC module 100. However, according to the DSC module 100, it is possible to dispose the external connecting terminals 18a and 18b so as to be adjacent to each other, and thus only one connector is required. For this reason, according to the DSC module 100, it is possible to achieve space saving. In addition, the generated current is low in the DSC module 100 when the DSC module 100 is used under a low illuminance. Specifically, the generated current is 2 mA or lower. For this reason, it is possible to sufficiently suppress the deterioration of the photoelectric conversion performance of the DSC module 100 even if a part of the transparent conductive layer 12D of the DSC 50D on one end side of the DSC 50A and DSC 50D at both ends of the DSCs 50A to 50D is disposed next to the second current extracting portion 12h which is electrically connected with the metal substrate 21 of the counter electrode 20 of the DSC 50A on the other end side via the groove 90 as the first current extracting portion 12f.

In addition, in the DSC module 100, the DSCs 50A to 50D are arranged in a line along the X direction, the transparent conductive layer 12D of the DSC 50D on one end side of the DSC 50A and DSC 50D at both ends of the DSCs 50A to 50D has the main body portion 12a provided on the inner side of the sealing portion 30A, the first current extracting portion 12f, and the connecting portion 12g which connects the main body portion 12a with the first current extracting portion 12f. For this reason, it is possible to more shorten the installation region of the connecting terminal 16 provided along the arrangement direction (X direction in FIG. 2) of the DSCs 50A to 50D in order to connect two adjacent DSCs 50 compared to a case in which the DSCs 50C and 50D of a part of the DSCs 50A to 50D are folded back in the middle and the DSC 50A and the DSC 50D are disposed so as to be adjacent to each other, and thus it is possible to achieve space saving to a greater extent. Furthermore, according to the DSC module 100, the generated current is usually low in a case in which the DSC module 100 is used in a low illuminance environment, and thus it is possible to sufficiently suppress the deterioration of the photoelectric conversion characteristics although the DSC module 100 further has the first connecting portion 12g which connects the main body portion 12a with the first current extracting portion 12f.

In addition, in the DSC module 100, a current collecting wiring 17 is arranged so as not to intersect the coupling portion 14 between the back sheet 80 and the conductive substrate 15. Since the current collecting wiring 17 is generally porous, the current collecting wiring has gas permeability, and thus, gases such as water vapor are permeable. For this reason, if the current collecting wiring 17 is arranged so as not to intersect the coupling portion 14 between the back sheet 80 and the conductive substrate 15, the infiltration of water vapor or the like from the outside through the current collecting wiring 17 into the space between the back sheet 80 and the conductive substrate 15 can be prevented. As a result, the DSC module 100 can have excellent durability. In addition, since the resistance of the current collecting wiring 17 is lower than that of the transparent conductive film 12D, even when a generating current becomes large, a deterioration in photoelectric conversion characteristics can be sufficiently suppressed.

Furthermore, the connecting terminal 16 is less likely to peel off from the protruding portion 12c of the transparent conductive layer 12 as the width of the connecting terminal 16 is narrower in a case in which the DSC module 100 is placed in an environment in which the temperature change is great. With regard to that point, in the DSC module 100, the conductive material non-connecting portion 16B of the connecting terminal 16 has a narrower width than the conductive material connecting portion 16A connected with the conductive material 60P. For this reason, the conductive material non-connecting portion 16B of the connecting terminals 16 is less likely to peel off from the protruding portion 12c of the transparent conductive layer 12. Hence, the conductive material non-connecting portion 16B does not peel off from the transparent conductive layer 12 and thus it is possible to maintain the connection with the transparent conductive layer 12 even if the conductive material connecting portion 16A peels off from the protruding portion 12c of the transparent conductive layer 12. Furthermore, it is possible to normally operate the DSC module 100 even if the conductive material connecting portion 16A peels off from the protruding portion 12c of the transparent conductive layer 12. Consequently, according to the DSC module 100, it is possible to improve the connection reliability. In addition, the conductive material 60P connected with the metal substrate 21 of the counter electrode 20 of one DSC 50 of two adjacent DSCs 50 is connected with the conductive material connecting portion 16A on the protruding portion 12c of the other DSC 50, and the conductive material connecting portion 16A is provided on the protruding portion 12c and the outer side of the sealing portion 30A. In other words, the connection of two adjacent DSCs 50 is performed on the outer side of the sealing portion 30A. For this reason, according to the DSC module 100, it is possible to improve the aperture ratio.

In addition, in the DSC module 100, in the DSC 50 that is connected with the adjacent DSC 50 among the DSCs 50A to 50D, the protruding portion 12c has the projecting portion 12d which laterally projects from the main body portion 12a and the facing portion 12e which extends from the projecting portion 12d and faces the main body portion 12a of the adjacent DSC 50, and at least the conductive material connecting portion 16A of the connecting terminal 16 is provided on the facing portion 12e.

In this case, at least the conductive material connecting portion 16A of the connecting terminal 16 is provided on the facing portion 12e facing the main body portion 12a of the adjacent DSC 50, and thus it is possible to sufficiently prevent the conductive material 60P connected with the conductive material connecting portion 16A from passing over the metal substrate 21 of the counter electrode 20 of the adjacent DSC 50 unlike the case in which at least the conductive material connecting portion 16A of the connecting terminal 16 is not provided on the facing portion 12e facing the main body portion 12a of the adjacent DSC 50. As a result, it is possible to sufficiently prevent the short circuit between the adjacent DSCs 50.

In addition, in the DSC module 100, both of the conductive material connecting portion 16A and the conductive material non-connecting portion 16B are disposed along the sealing portion 30A. For this reason, it is possible to save the space required for the connecting terminal 16 compared to the case of disposing the conductive material connecting portion 16A and the conductive material non-connecting portion 16B in the direction away from the sealing portion 30A.

Furthermore, in the DSC module 100, the adhesive portion 80B of the back sheet 80 is spaced apart from the sealing portion 30A of the DSC 50. For this reason, it is sufficiently suppressed that the sealing portion 30A is stretched since the adhesive portion 80B is constricted at a low temperature and thus an excessive stress is applied to the interface between the sealing portion 30A and the conductive substrate 15 or the counter electrode 20. In addition, at a high temperature as well, it is sufficiently suppressed that the sealing portion 30A is pressed since the adhesive portion 80B expands and thus an excessive stress is applied to the interface between the sealing portion 30A and the conductive substrate 15 or the counter electrode 20. In other words, it is sufficiently suppressed that an excessive stress is applied to the interface between the sealing portion 30A and the conductive substrate 15 or the counter electrode 20 both at a high temperature and a low temperature. For this reason, it is possible for the DSC module 100 to exhibit excellent durability.

Furthermore, in the DSC module 100, the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. For this reason, it is possible to more sufficiently improve the aperture ratio of the DSC module 100. In addition, in the DSC module 100, the adjacent first sealing portions 31A are integrated between the adjacent counter electrodes 20 and the adjacent second sealing portions 32A are integrated between the adjacent counter electrodes 20. Here, the sealing portion exposed to the atmosphere is in two places in between the adjacent DSCs 50 when the adjacent first sealing portions 31A are not integrated. In contrast to this, in the DSC module 100, the sealing portion exposed to the atmosphere is in one place in between the adjacent DSCs 50 since the adjacent first sealing portions 31A are integrated. In other words, the sealing portion exposed to the atmosphere is in only one place of the partitioning portion 31b in between the adjacent DSCs 50 since the first integrated sealing portion 31 is constituted by the annular portion 31a and the partitioning portion 31b. In addition, the penetration distance of moisture or the like from the atmosphere to the electrolyte 40 extends since the first sealing portions 31A are integrated. For this reason, it is possible to sufficiently reduce the amount of moisture or air penetrating from the outside of the DSC 50 in between the adjacent DSCs 50. In other words, it is possible to sufficiently improve the sealing ability of the DSC module 100. In addition, according to the DSC module 100, the adjacent first sealing portions 31A are integrated. For this reason, it is possible to secure a sufficient sealing width at the partitioning portion 31b even if the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. In other words, according to the DSC module 100, it is possible to sufficiently increase the bonding strength of the first sealing portion 31A with the conductive substrate 15 and the bonding strength of the first sealing portion 31A with the counter electrode 20 while improving the aperture ratio. As a result, it is possible to improve the aperture ratio as well as it is possible to sufficiently suppress the peeling of the first sealing portion 31A from the conductive substrate 15 and the counter electrode 20 even if the electrolyte 40 expands and thus an excessive stress directed from the inner side to the outer side of the first sealing portion 31A is applied in the case of using the DSC module 100 under a high temperature, and thus it is possible to exhibit excellent durability.

Furthermore, in the DSC module 100, the width R of the partitioning portion 31b of the first integrated sealing portion 31 is 100% or more and less than 200% of the width T of the annular portion 31a of the first integrated sealing portion 31. In this case, the width P of the partitioning portion 31b is 100% or more of the width T of the annular portion 31a in the partitioning portion 31b of the first integrated sealing portion 31, and thus the penetration distance of moisture or the like from the atmosphere to the electrolyte 40 extends compared to a case in which the width R of the partitioning portion 31b is less than 100% of the width T of the annular portion 31a in the partitioning portion 31b of the first integrated sealing portion 31. For this reason, it is possible to more sufficiently suppress that the moisture penetrates from the outside through the partitioning portion 31b present between the adjacent DSCs 50. On the other hand, it is possible to more improve the aperture ratio compared to a case in which the width R of the partitioning portion 31b exceeds 200% of the width T of the annular portion 31a.

In addition, in the DSC module 100, the second sealing portion 32A is adhered to the first sealing portion 31A, and the edge portion 20a of the counter electrode 20 is sandwiched by the first sealing portion 31A and the second sealing portion 32A. For this reason, the peeling is sufficiently suppressed by the second sealing portion 32A even if the stress in the direction away from the working electrode 10 with respect to the counter electrode 20 is applied. In addition, the partitioning portion 32b of the second integrated sealing portion 32 is adhered to the first sealing portion 31A through the gap S between the adjacent counter electrodes 20 and thus it is reliably prevented that the counter electrodes 20 of the adjacent DSCs 50 come in contact with each other.

Next, the working electrode 10, the coating layer 19, the coupling portion 14, the photosensitizing dye, the counter electrode 20, the sealing portion 30A, the insulating material 33, the electrolyte 40, the conductive materials 60P and 60Q, the back sheet 80, and the desiccant 95 will be described in detail.

(Working Electrode)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the DSC module 100 and is not particularly limited, but it may be set into the range of from 50 to 10000 µm, for example.

Examples of the material contained in the transparent conductive layer 12 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers containing different conductive metal oxides. It is preferable that the transparent conductive layer 12 contain FTO since FTO exhibits high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 µm, for example.

In addition, the resistance value of the connecting portion 12g of the transparent conductive layer 12D of the transparent conductive layer 12 is not particularly limited but is preferably equal to or less than the resistance value represented by the following Equation (1).

$$\text{Resistance value} = \text{number of DSC 50 connected in series} \times 120\Omega \tag{1}$$

In this case, it is possible to sufficiently suppress the deterioration of the performance of the DSC module 100 compared to a case in which the resistance value of the connecting portion 12g exceeds the resistance value represented by Equation (1) above. In the present embodiment, the number of DSCs 50 is 4 and thus the resistance value represented by Equation (1) above becomes 480 Ω, and consequently, the resistance value of the connecting portion 12g is preferably 480 Ω or less.

The thickness of the insulating material 33 is usually from 10 to 30 µm and preferably from 15 to 25 µm.

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the conductive material 60P but it is preferable to be constituted by the same material.

In this case, it is possible to more sufficiently improve the adhesive property of the connecting terminal 16 with the conductive material 60P since the connecting terminal 16 and the conductive material 60P are constituted by the same material. For this reason, it is possible to more improve the connection reliability of the DSC module 100.

In the connecting terminal 16, the width of the conductive material non-connecting portion 16B is not particularly limited as long as it is narrower than the width of the conductive material connecting portion 16A, but it is preferable to be equal to or less than ½ of the width of the conductive material connecting portion 16A.

In this case, it is possible to more improve the connection reliability of the DSC module 100 compared to a case in which the width of the conductive material non-connecting portion 16B exceeds ½ of the width of the conductive material connecting portion 16A.

The width of the conductive material connecting portion 16A is not particularly limited but is preferably from 0.5 to 5 mm and more preferably from 0.8 to 2 mm.

The oxide semiconductor layer 13 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_2O_3$), zirconium oxide ($ZrO_2$), thallium oxide ($Ta_2O$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The oxide semiconductor layer 13 is usually constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 may be set to from 0.5 to 50 µm, for example.

(Coating Layer)

The coating layer 19 is not particularly limited as long as it is constituted by a material which can transmit light and has a refractive index higher than that of the transparent substrate 11. As such a material, a material having a refractive index higher than that of the transparent substrate 11 may be appropriately selected from, for example, light transmissive materials of resins such as an acrylic resin and a polyethylene resin, glass, and the like. Among these, from the viewpoint of having high transparency, an acrylic resin is particularly preferable. Here, it is preferable that the coating layer 19 further contain an ultraviolet absorbing agent. In this case, ultraviolet rays are absorbed by the ultraviolet absorbing agent in the coating layer 19 and the deterioration of a photosensitizing dye can be more sufficiently suppressed. Therefore, durability of the DSC module 100 can be further improved. As such an ultraviolet absorbing agent, for example, benzotriazole, benzophenone, or the like can be used. The content ratio of the ultraviolet absorbing agent in the light transmissive material may be set to, for example, 1 to 20% by mass.

As illustrated in FIG. 4, in the embodiment, when it is assumed that an inner circumferential surface 34 of the annular portion 31a at the outer side of the first integrated sealing portion 31 extends to pass over the coating layer 19 along the thickness direction of the sealing portion 30, the peripheral portion 19a of the coating layer 19 indicates an annular portion at the outer side of the inner circumferential surface 34 of the extended annular portion 31a. Further, a portion at the inner side of the annular peripheral portion 19a becomes the center portion 19b. Incidentally, in FIG. 4, the dashed line represents the first integrated sealing portion 31 and the two-dot chain line represents the annular portion 31a.

In the coating layer 19, t1/t2 may be larger than 1, but is preferably 1.5 to 4 and more preferably 2 to 3.8. Here, t1 is a maximum thickness of the center portion 19b and t2 is an average thickness of the peripheral portion 19a.

Here, t1 of the coating layer is not particularly limited, but for example, may be set to 5 to 100 µm.

Furthermore, a ratio (n2/n1) of a refractive index n2 of the coating layer 19 to a refractive index n1 of the transparent substrate 11 may be larger than 1, but is generally 1.005 to 2 and preferably 1.005 to 1.5.

The refractive index n1 of the transparent substrate 11 is not particularly limited, but is generally 1.40 to 1.60.

Furthermore, the coating layer 19 preferably covers the entire surface of the light receiving surface 11a of the transparent substrate 11. In this case, it is possible to more sufficiently collect light, as compared with a case where the coating layer 19 does not cover the entire surface of the light receiving surface 11a.

(Coupling Portion)

The material constituting the coupling portion 14 is not particularly limited as long as it can make the back sheet 80 adhere to the transparent conductive layer 12, and it is possible to use, for example, a glass frit, a resin material which is the same as the resin material used for the sealing portion 31A, or the like as the material constituting the coupling portion 14. Among them, the coupling portion 14 is preferably a glass frit. It is possible to effectively suppress the penetration of moisture or the like from the outside of the back sheet 80 since the glass frit exhibits higher sealing ability than the resin material.

(Photosensitizing Dye)

Examples of the photosensitizing dye may include a ruthenium complex having a ligand containing a bipyridine structure, terpyridine structure or the like, or an organic dye such as porphyrin, eosin, rhodamine, or merocyanine.

(Counter Electrode)

As described above, the counter electrode 20 is equipped with a metal substrate 21 and a conductive catalyst layer 22 which is provided on the working electrode 10 side of the metal substrate 21 and promotes the reduction reaction on the surface of the counter electrode 20.

The metal substrate 21 is constituted by, for example, a corrosion-resistant metallic material such as titanium, nickel, platinum, molybdenum, tungsten, aluminum, or stainless steel. The thickness of the metal substrate 21 is appropriately determined depending on the size of the DSC module 100 and is not particularly limited, but it may be set to from 0.005 to 0.1 mm, for example.

The catalyst layer 22 is constituted by platinum, a carbon-based material, or a conductive polymer. Here, a carbon nanotube is suitably used as the carbon-based material.

(Sealing Portion)

The sealing portion 30A is constituted by the first sealing portion 31A and the second sealing portion 32A.

Examples of the material constituting the first sealing portion 31A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is usually from 40 to 90 μm and preferably from 60 to 80 μm.

The width P of the adhesive portion of the counter electrode 20 with the partitioning portion 31b is 25% or more and less than 100% of the width Q of the adhesive portion of the counter electrode 20 with the annular portion 31a of the first integrated sealing portion 31. In this case, it is possible to exhibit more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the DSC module 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio with excellent durability.

Examples of the material constituting the second sealing portion 32A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer in the same manner as the first sealing portion 31A.

The thickness of the second sealing portion 32A is usually from 20 to 45 μm and preferably from 30 to 40 μm.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above and the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Meanwhile, the electrolyte 40 contains a redox couple consisting of $I^-/I_3^-$, and the concentration of $I^-$ is preferably 0.006 mol/L or less, more preferably from 0 to $6 \times 10^{-6}$ mol/L, and even more preferably from 0 to $6 \times 10^{-8}$ mol/L. In this case, it is possible to more reduce the leakage current since the concentration of $I_3^-$ which carries electrons is low. For this reason, it is possible to more increase the open circuit voltage, and thus it is possible to more improve the photoelectric conversion characteristics.

(Conductive Material)

As the conductive materials 60P and 60Q, for example, a metal film is used. It is possible to use, for example, silver or copper as the metallic material constituting the metal film.

(Back Sheet)

As described above, the back sheet 80 includes the laminate 80A including a weather resistant layer and a metal layer and the adhesive portion 80B which is provided on the surface of the DSC 50 side of the laminate 80A and adheres the laminate 80A to the coupling portion 14.

The weather resistant layer may be constituted by, for example, polyethylene terephthalate or polybutylene terephthalate.

The thickness of the weather resistant layer may be from 50 to 300 μm, for example.

The metal layer may be constituted by, for example, a metallic material containing aluminum. The metallic material is usually constituted by aluminum simple substance but may be an alloy of aluminum with other metals. Examples of the other metals may include copper, manganese, zinc, magnesium, lead, and bismuth. Specifically, a 1000 series aluminum is desirable in which other metals are added to aluminum of 98% or higher purity in a trace quantity. This is because this 1000 series aluminum is inexpensive and excellent in workability compared to other aluminum alloys.

The thickness of the metal layer is not particularly limited but may be from 12 to 30 μm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 µm, for example.

(Desiccant)

The desiccant 95 may be in a sheet shape or granular. The desiccant 95 may be one which absorbs moisture, for example, and examples of the desiccant 95 may include silica gel, alumina, and zeolite.

Figure 9:
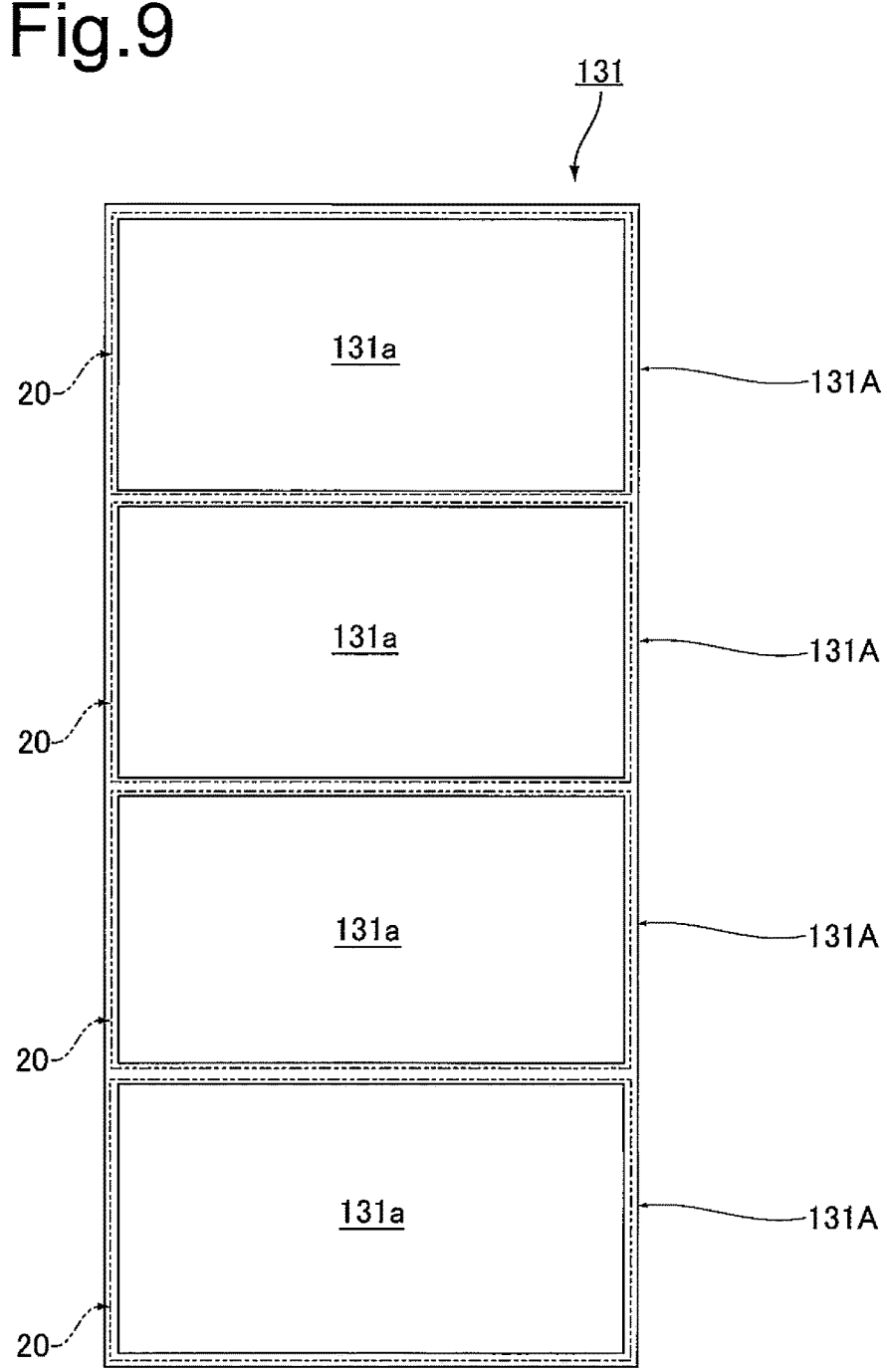
FIG. 9 is a plan view illustrating a first integrated sealing portion forming body for forming the first integrated sealing portion of FIG. 5.

Next, the method of manufacturing the DSC module 100 will be described with reference to FIG. 3, FIG. 8 and FIG. 9. FIG. 9 is a plan view illustrating a first integrated sealing portion forming body for forming a first integrated sealing portion of FIG. 5.

First, one transparent parallel plate is prepared.

Next, a laminate obtained by forming a transparent conductive film on the parallel plate is prepared.

A As the method of forming the transparent conductive layer, a sputtering method, a vapor deposition method, a spray pyrolysis deposition method (SPD), or a CVD method is used.

Next, as illustrated in FIG. 3, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the DSCs 50A to 50D are formed so as to have the quadrangular-shaped main body portion 12a and the protruding portion 12c. At this time, the transparent conductive layers 12A to 12C corresponding to the DSCs 50A to 50C are formed such that the protruding portion 12c has not only the projecting portion 12d but also the facing portion 12e which extends from the projecting portion 12d and faces the main body portion 12a of the adjacent DSC 50. In addition, the transparent conductive layer 12D is formed so as to have not only the quadrangular-shaped main body portion 12a and the projecting portion 12d but also the first current extracting portion 12f and the connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source. In this manner, a transparent conductive film 12 is formed on the parallel plate.

Next, after a paste containing the same material as that of the parallel plate is applied to one surface of the parallel plate, the paste is spin-coated while the laminate is rotated, for example. At this time, in order for the paste to become thicker toward the peripheral portion in the parallel plate, the rotation number of the laminate may be set to, for example, 100 to 7000 rpm. Then, after the paste is dried to obtain a dried product, the dried product is calcined. In this way, the transparent substrate 11 consisting of the dried product after calcination and the parallel plate is obtained.

Next, a precursor of the connecting terminal 16 constituted by the conductive material connecting portion 16A and the conductive material non-connecting portion 16B is formed on the protruding portion 12c of the transparent conductive layers 12A to 12C. Specifically, the precursor of the connecting terminal 16 is formed such that the conductive material connecting portion 16A is provided on the facing portion 12e. In addition, the precursor of the connecting terminal 16 is also formed on the transparent conductive layer 12E. In addition, the precursor of conductive material non-connecting portion 16B is formed so as to be narrower than the width of the conductive material connecting portion 16A. The precursor of the connecting terminal 16 can be formed, for example, by coating and drying a silver paste.

Moreover, a precursor of the current collecting wiring 17 is formed on the connecting portion 12g of the transparent conductive layer 12D. The precursor of the current collecting wiring 17 can be formed, for example, by coating and drying a silver paste.

In addition, precursors of the external connecting terminals 18a and 18b for extracting the current to the outside are respectively formed on the first current extracting portion 12f and the second current extracting portion 12h of the transparent conductive layer 12A. The precursor of the external connecting terminal can be formed, for example, by coating and drying a silver paste.

Furthermore, a precursor of the insulating material 33 composed of a glass frit is formed so as to enter into the first groove 90A formed along the edge portion of the main body portion 12a and to cover the edge portion of the main body portion 12a as well. The insulating material 33 can be formed, for example, by coating and drying a paste containing a glass frit.

In addition, in order to fix the back sheet 80, in the same manner as the insulating material 33, a precursor of the annular coupling portion 14 is formed so as to surround the insulating material 33 and to pass through the transparent conductive layer 12D, the transparent conductive layer 12E, and the transparent conductive layer 12F.

Furthermore, a precursor of the oxide semiconductor layer 13 is formed on the main body portion 12a of each of the transparent conductive layers 12A to 12D. The precursor of the oxide semiconductor layer 13 can be formed by printing and then drying a paste for oxide semiconductor layer formation containing oxide semiconductor particles.

The paste for oxide semiconductor layer formation contains a resin such as polyethylene glycol and a solvent such as terpineol in addition to the oxide semiconductor particles.

It is possible to use, for example, a screen printing method, a doctor blading method, or a bar coating method as the printing method of the paste for oxide semiconductor layer formation.

Finally, the precursor of the connecting terminal 16, the precursor of the insulating material 33, the precursor of the coupling portion 14, and the precursor of the oxide semiconductor layer 13 are collectively fired to form the connecting terminal 16, the insulating material 33, the coupling portion 14, and the oxide semiconductor layer 13.

At this time, the firing temperature varies depending on the kind of the oxide semiconductor particles, the silver paste and the glass frit but is usually from 350 to 600° C., and the firing time also varies depending on the kind of the oxide semiconductor particles, the silver paste or the glass frit but is usually from 1 to 5 hours.

In this manner, as illustrated in FIG. 8, obtained is the working electrode 10 which has the conductive substrate 15 and on which the coupling portion 14 for fixing the back sheet 80 is formed.

Next, the photosensitizing dye is supported on the oxide semiconductor layer 13 of the working electrode 10. For this, the photosensitizing dye may be adsorbed on the oxide semiconductor layer 13 by immersing the working electrode 10 in a solution containing the photosensitizing dye, the extra photosensitizing dye is then washed out with the solvent component of the above solution, and drying is performed, thereby the photosensitizing dye may be adsorbed on the oxide semiconductor layer 13. However, it is also possible to support the photosensitizing dye on the oxide semiconductor layer 13 by coating a solution containing the photosensitizer dye on the oxide semiconductor layer 13 and then drying to adsorb the photosensitizing dye on the oxide semiconductor layer 13.

Next, the electrolyte 40 is disposed on the oxide semiconductor layer 13.

Next, as illustrated in FIG. 9, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131a in the resin film for sealing as many as the number of the DSCs 50. The first integrated sealing portion forming body 131 has a structure formed by integrating a plurality of first sealing portion forming bodies 131A.

Thereafter, this first integrated sealing portion forming body 131 is adhered on the conductive substrate 15. At this time, the first integrated sealing portion forming body 131 is adhered so as to be superimposed on the insulating material 33 constituting the conductive substrate 15. The adhesion of the first integrated sealing portion forming body 131 to the conductive substrate 15 can be performed by heating the first integrated sealing portion forming body 131 to melt. In addition, the first integrated sealing portion forming body 131 is adhered to the conductive substrate 15 such that the main body portion 12a of the transparent conductive layer 12 is disposed on the inner side of the first integrated sealing portion forming body 131.

Meanwhile, the counter electrodes 20 are prepared to have the same number as the number of the DSCs 50.

The counter electrode 20 can be obtained by forming the conductive catalyst layer 22 which promotes the reduction reaction on the surface of the counter electrode 20 on the metal substrate 21.

Next, one more piece of the first integrated sealing portion forming body 131 described above is prepared. Thereafter, each of the plural counter electrodes 20 is bonded so as to close each of the openings 131a of the first integrated sealing portion forming body 131.

Next, the first integrated sealing portion forming body 131 adhered to the counter electrode 20 and the first integrated sealing portion forming body 131 adhered to the working electrode 10 are superimposed and melted by heating while applying a pressure to the first integrated sealing portion forming body 131. In this manner, the first integrated sealing portion 31 is formed between the conductive substrate 15 and the counter electrode 20. At this time, the first integrated sealing portion 31 is formed such that the width P of the adhesive portion of the surface on the conductive substrate 15 side of the counter electrode 20 with the partitioning portion 31b of the first integrated sealing portion 31 is narrower than the width Q of the adhesive portion of the surface on the conductive substrate 15 side of the counter electrode 20 with the annular portion 31a of the first integrated sealing portion 31. In addition, the first integrated sealing portion 31 is formed such that the width R of the partitioning portion 31b of the first integrated sealing portion 31 is 100% or more and less than 200% of the width T of the annular portion 31a of the first integrated sealing portion 31. The formation of the first integrated sealing portion 31 may be performed under the atmospheric pressure or reduced pressure, but it is preferable to be performed under reduced pressure.

Next, the second integrated sealing portion 32 is prepared (see FIG. 6). The second integrated sealing portion 32 has a structure formed by integrating a plurality of the first sealing portions 32A. The second integrated sealing portion 32 can be obtained by preparing one sheet of resin film for sealing and forming a quadrangular-shaped opening 32c in the resin film for sealing as many as the number of the DSCs 50. The second integrated sealing portion 32 is bonded to the counter electrode 20 so as to sandwich the bonded edge portion 20a of the counter electrode 20 together with the first integrated sealing portion 31. The adhesion of the second integrated sealing portion 32 to the counter electrode 20 can be performed by heating the second integrated sealing portion 32 to melt.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer. It is preferable that the constituent material of the resin film for sealing to form the second integrated sealing portion 32 have a higher melting point than the constituent material of the resin film for sealing to form the first integrated sealing portion 31. In this case, the second sealing portion 32A is harder than the first sealing portion 31A, and thus it is possible to effectively prevent the contact between the counter electrodes 20 of the adjacent DSCs 50. In addition, the first sealing portion 31A is softer than the second sealing portion 32A, and thus it is possible to effectively alleviate the stress applied to the sealing portion 30A.

Next, the bypass diodes 70A, 70B, and 70C are fixed to the partitioning portions 32b of the second sealing portions 32. In addition, the bypass diode 70D is fixed on the annular portion 32a of the second integrated sealing portion 32 of the sealing portion 30A of the DSC 50D as well.

Thereafter, the conductive material 60Q is fixed to the metal substrate 21 of the counter electrode 20 of the DSCs 50B and 50C so as to connect the bypass diodes 70A to 70D with each other. Moreover, the conductive material 60P is formed such that each of the conductive materials 60Q between the bypass diodes 70A and 70B, between the bypass diodes 70B and 70C, and between the bypass diodes 70C and 70D is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is fixed to the metal substrate 21 of the counter electrode 20 of the DSC 50A so as to connect the conductive material connecting portion 16A on the transparent conductive layer 12E and the bypass diode 70A. Moreover, the transparent conductive layer 12D is connected with the bypass diode 70A by the conductive material 60P.

At this time, with regard to the conductive material 60P, a paste containing a metallic material constituting the conductive material 60P is prepared, and this paste is coated from the counter electrode 20 over the conductive material connecting portion 16A of the connecting terminal 16 of the adjacent DSC 50 and cured. With regard to the conductive material 60Q, a paste containing a metallic material constituting the conductive material 60Q is prepared, and this paste is coated on each of the counter electrodes 20 so as to link the adjacent bypass diodes and cured. At this time, as the paste above, it is preferable to use a low-temperature curing type paste which is capable of being cured at a temperature of 90° C. or less from the viewpoint of avoiding an adverse effect on the photosensitizing dye.

Finally, the back sheet 80 is prepared, and the peripheral portion 80a of the back sheet 80 is adhered to the coupling portion 14. At this time, the back sheet 80 is disposed such that the adhesive portion 80B of the back sheet 80 is spaced apart from the sealing portion 30A of the DSC 50.

Finally, a coating layer forming material for forming the coating layer 19 is applied onto the light receiving surface 11a of the conductive substrate 15. At this time, the application is performed such that the surface of the coating layer forming material becomes flat. The coating layer forming material includes, for example, a light transmissive material, an ultraviolet absorbing agent which is added as necessary, and a solvent dissolving the light transmissive material and the ultraviolet absorbing agent. At this time, as a material constituted by a light transmissive material and an ultraviolet absorbing agent which is added as necessary, a material having a refractive index higher than the refractive index of the transparent substrate 11 is used. In addition, in order to flatten the surface of the coating layer forming material, for example, a bar coater may be used. Then, the coating layer forming material is dried to obtain the coating layer 19 on the light receiving surface 11a of the transparent substrate 11.

The DSC module 100 is obtained in the manner described above.

Meanwhile, in the description above, a method to collectively fire the precursor of the connecting terminal 16, the precursor of the insulating material 33, the precursor of the coupling portion 14, and the precursor of the oxide semiconductor layer 13 is used in order to form the connecting terminal 16, the insulating material 33, the coupling portion 14, and the oxide semiconductor layer 13, but the connecting terminal 16, the insulating material 33, the coupling portion 14, and the oxide semiconductor layer 13 may be formed by separately firing each of the precursors.

The invention is not limited to the embodiment described above. For example, in the above embodiment, the DSCs 50A to 50D are arranged in a line along the X direction in FIG. 2, but the DSCs 50C and 50D which are a part of the DSCs 50A to 50D are folded back in the middle and the DSC 50A and the DSC 50D are disposed so as to be adjacent to each other as a DSC module 200 illustrated in FIG. 10. In this case, unlike the DSC module 100, it is not necessary to provide the connecting portion 12g between the main body portion 12a and the first current extracting portion 12f in the transparent conductive layer 12D. For this reason, it is also not necessary to provide the current collecting wiring 17.

Figure 11:
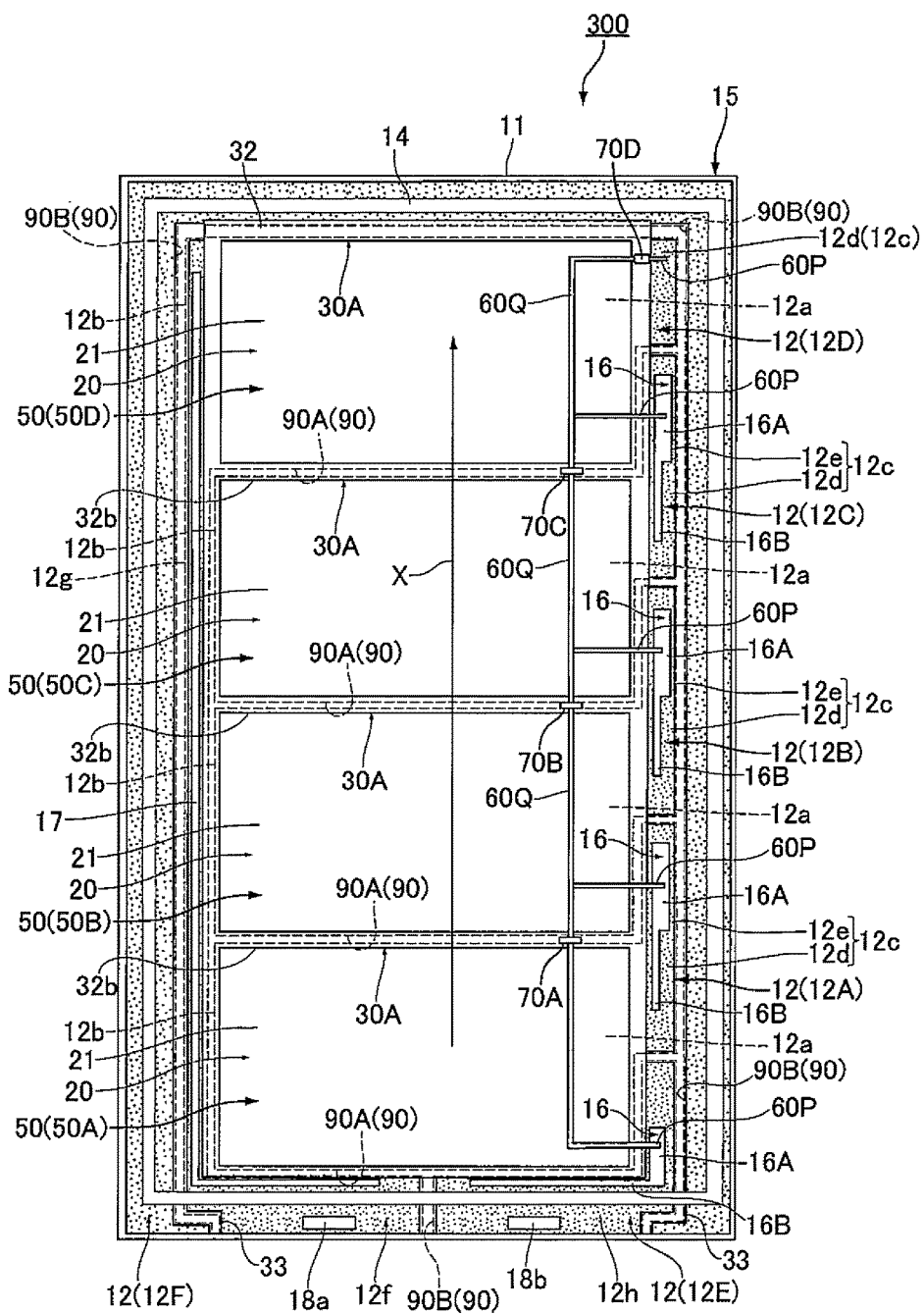
FIG. 11 is a plan view illustrating a part of a third embodiment of the dye-sensitized solar cell element of the invention.

In addition, in the above embodiment, the second groove 90B which intersects the coupling portion 14 between the back sheet 80 and the conductive substrate 15 is not covered with the insulating material 33 made of a glass frit. However, like the DSC module 300 illustrated in FIG. 11, the second groove 90B is preferably covered with the insulating material 33 made of a glass frit. In addition, in FIG. 11, the back sheet 80 is omitted. As illustrated in FIG. 11, when the second groove 90B intersects the coupling portion 14, moisture can be infiltrated through the second groove 90B into the space between the back sheet 80 and the conductive substrate 15 if the second groove 90B is not covered with the insulating material 33. In contrast, since the insulating material 33 enters into the second groove 90B, and the insulating material 33 covers an edge portion of the portion of the transparent conductive film 12 excluding the main body portion 12a, the infiltration of the moisture from the outer side of the back sheet 80 into the inner side is sufficiently suppressed. For this reason, the entrance of the moisture being infiltrated into the space between the back sheet 80 and the conductive substrate 15 into the inner side of the sealing portion 30A through the sealing portion 30A is sufficiently suppressed. For this reason, a deterioration in durability of the DSC module 300 can be sufficiently suppressed.

Figure 12:
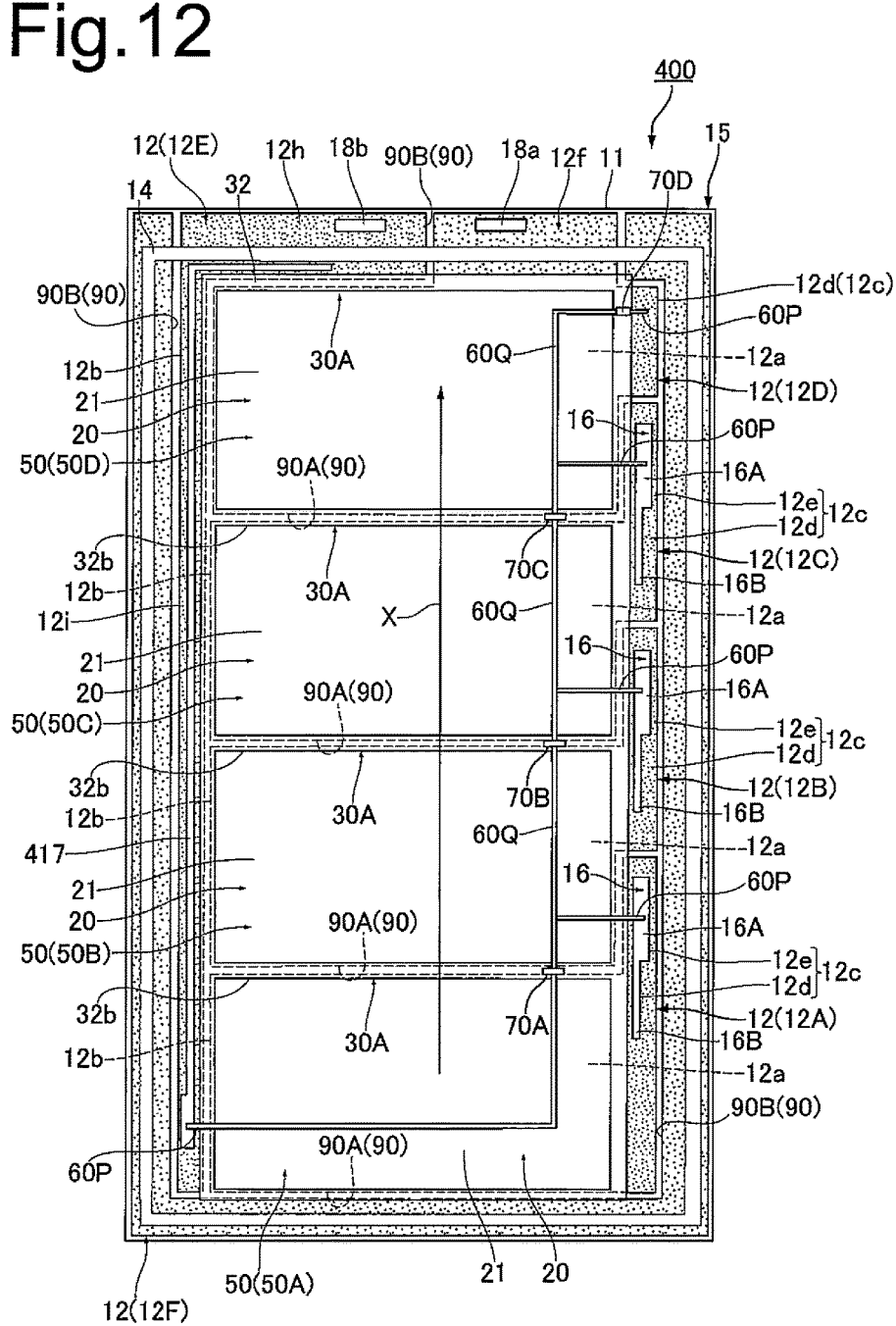
FIG. 12 is a plan view illustrating a part of a fourth embodiment of the dye-sensitized solar cell element of the invention.

Furthermore, in the above embodiment, the first current extracting portion 12f and the second current extracting portion 12h are disposed in the vicinity on the DSC 50A side, but the first current extracting portion 12f and the second current extracting portion 12h may be disposed in the vicinity on the DSC 50D side as illustrated in a DSC module 400 illustrated in FIG. 12. In this case, the first current extracting portion 12f is provided so as to protrude on the side opposite to the DSC 50C with respect to the main body portion 12a of the transparent conductive layer 12D to the outer side of the sealing portion 30A. On the other hand, the second current extracting portion 12h is provided on the side opposite to the DSC 50C with respect to the main body portion 12a of the transparent conductive layer 12D. In addition, a connecting portion 12i as a second connecting portion extends along the transparent conductive layers 12A to 12D, and this connecting portion 12i connects the second current extracting portion 12h and the metal substrate 21 of the counter electrode 20 of the DSC 50A. Specifically, a current collecting wiring 417 is provided on the connecting portion 12i along the connecting portion 12i, and this current collecting wiring 417 is connected with the conductive material 60P extending from the bypass diode 70A. It is possible to achieve space saving while exhibiting excellent photoelectric conversion characteristics by this DSC module 400 as well. Meanwhile, in this case, it is the same as the above embodiment that it is preferable that the resistance value of the connecting portion 12i be equal to or less than the resistance value represented by the following Equation (1).

$$\text{Resistance value} = \text{number of DSC 50 connected in series} \times 120\Omega \quad (1)$$

Figure 13:
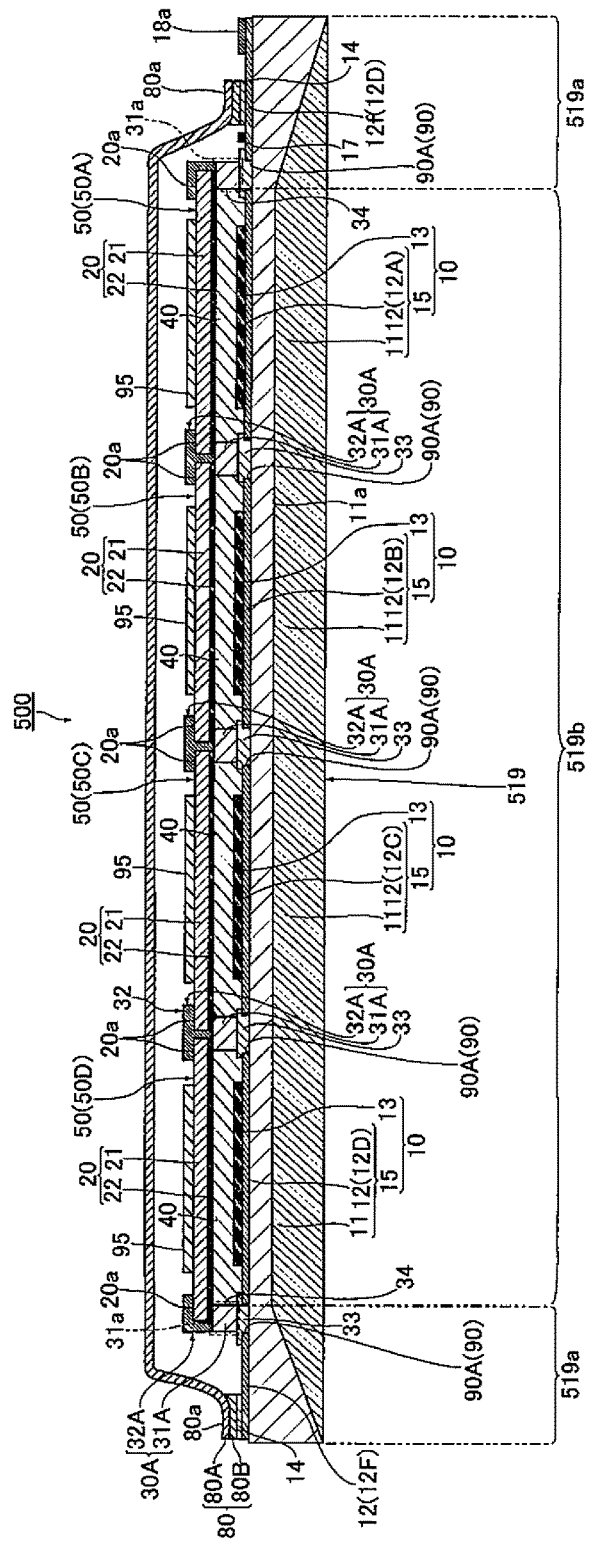
FIG. 13 is an end view of the cross section illustrating a fifth embodiment of the dye-sensitized solar cell element of the invention.

Furthermore, in the above embodiment, as a DSC module 500 illustrated in FIG. 13, an interface between the light receiving surface 11a of the transparent substrate 11 and a center portion 519b of a coating layer 519 may be a flat surface, and an interface between the light receiving surface 11a of the transparent substrate 11 and the peripheral portion 519a of the coating layer 519 may be an inclined surface which is inclined with respect to an interface between the center portion 519b and the light receiving surface 11a. In other words, the interface between the light receiving surface 11a and the coating layer 519 may be convex toward the transparent substrate 11. Incidentally, in FIG. 13, a surface, which is opposite to the transparent substrate 11, of the coating layer 519 is a flat surface. In addition, the inclined surface may be a flat surface or a curved surface.

Figure 14:
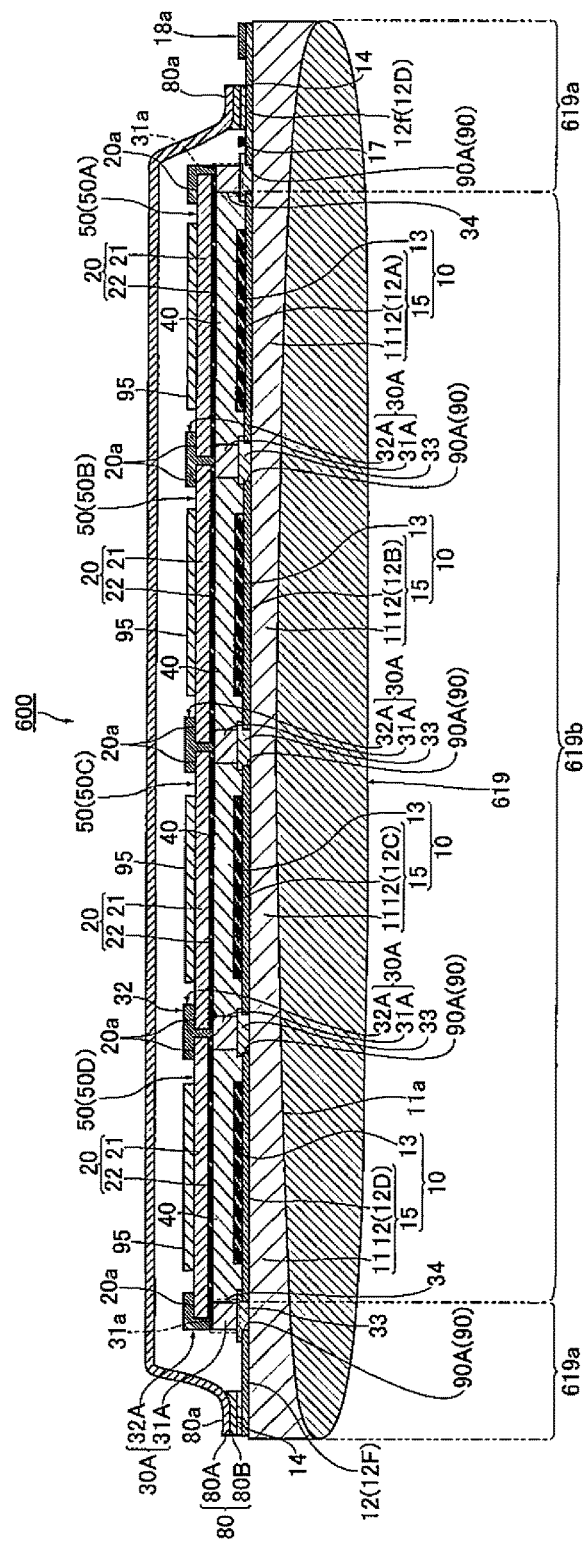
FIG. 14 is an end view of the cross section illustrating a sixth embodiment of the dye-sensitized solar cell element of the invention.

Furthermore, in the above embodiment, as a DSC module 600 illustrated in FIG. 14, an interface between the light receiving surface 11a of the transparent substrate 11 and a coating layer 619 may be curved to be convex toward the transparent substrate 11, and a surface, which is opposite to the transparent substrate 11, of the coating layer 619 may be curved to be convex toward a side opposite to the transparent substrate 11. As illustrated in FIG. 14, in the DSC module 600, when it is assumed that the inner circumferential surface 34 of the annular portion 31*a* of the sealing portion 31A extends to pass over a coating layer 1019, an annular portion at the outer side of the inner circumferential surface 34 of the extended annular portion 31*a* becomes a peripheral portion 619*a* of the coating layer 619, and a portion at the inner side of the annular peripheral portion 619*a* becomes a center portion 619*b*.

Figure 15:
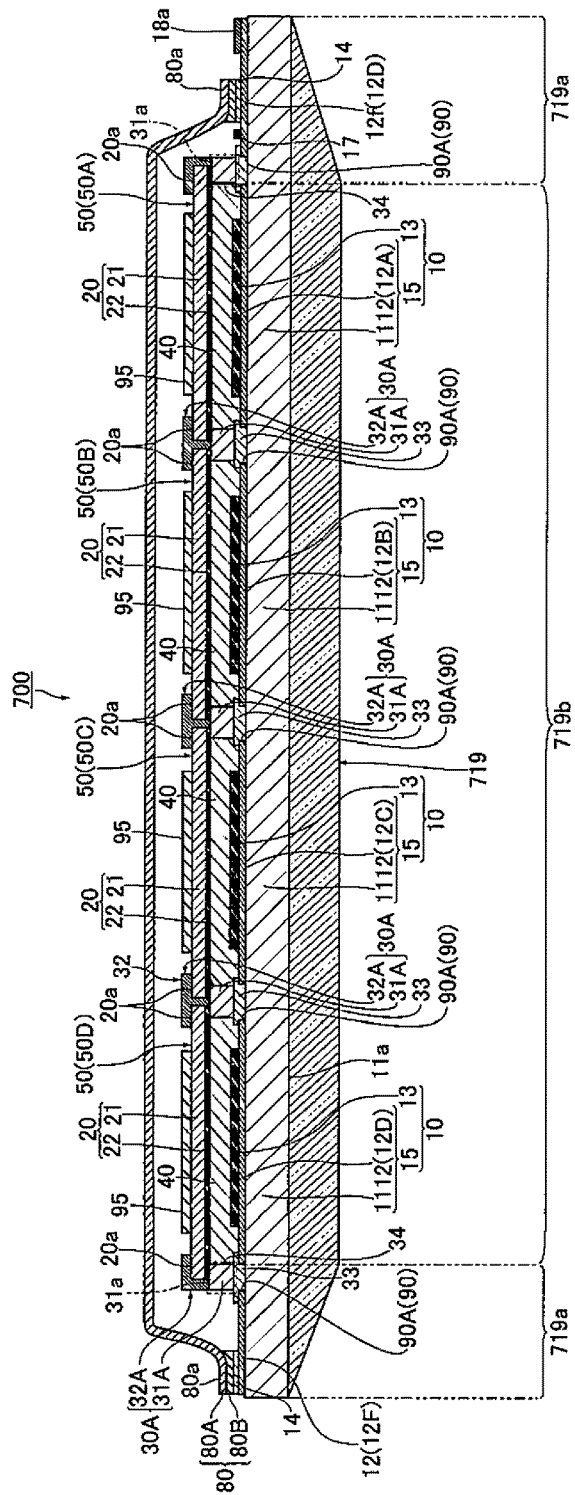
FIG. 15 is an end view of the cross section illustrating a seventh embodiment of the dye-sensitized solar cell element of the invention.

Furthermore, in the above embodiment, as a DSC module 700 illustrated in FIG. 15, an interface between the light receiving surface 11*a* of the transparent substrate 11 and a coating layer 719 may be a flat surface, and a surface, which is opposite to the transparent substrate 11, of the coating layer 719 may be convex toward a side opposite to the transparent substrate 11. Here, a surface, which is opposite to the transparent substrate 11, of a center portion 719*b* of the coating layer 719 is a flat surface, and a surface, which is opposite to the transparent substrate 11, of each peripheral portion 719*a* of the coating layer 719 is an inclined surface which is inclined with respect to the flat surface of the center portion 719*b*. Here, the inclined surface may be a flat surface or a curved surface.

Figure 16:
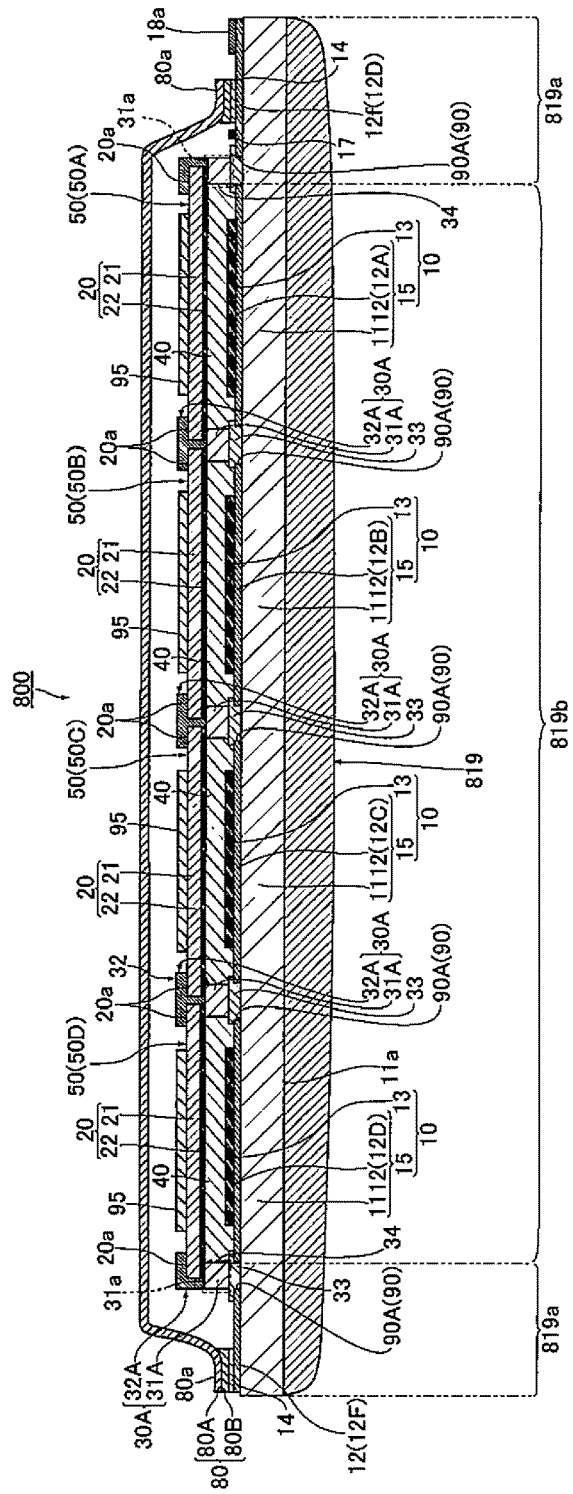
FIG. 16 is an end view of the cross section illustrating an eighth embodiment of the dye-sensitized solar cell element of the invention.

Furthermore, in the above embodiment, as a DSC module 800 illustrated in FIG. 16, an interface between the light receiving surface 11*a* of the transparent substrate 11 and a coating layer 819 may be a flat surface, and a surface, which is opposite to the transparent substrate 11, of the coating layer 819 may be curved to be convex toward a side opposite to the transparent substrate 11. As illustrated in FIG. 16, in the DSC module 800, when it is assumed that the inner circumferential surface 34 of the annular portion 31*a* of the sealing portion 31A extends to pass over the coating layer 819, an annular portion at the outer side of the inner circumferential surface 34 of the extended annular portion 31*a* becomes a peripheral portion 819*a* of the coating layer 819, and a portion at the inner side of the annular peripheral portion 819*a* becomes a center portion 819*b*.

Incidentally, as materials constituting the coating layers 519, 619, 719, and 819, the same material as that of the coating layer 19 can be used.

Furthermore, in the above embodiment, the entire transparent substrate 11 may be curved to be convex toward the counter electrode 20.

In addition, in the above embodiment, the groove 90 has the second groove 90B. However, the second groove 90B may not be necessarily formed.

In addition, in the above embodiment, the widths of the conductive material connecting portion 16A and the conductive material connecting portion 16B of the connecting terminal 16 are set to be constant, but each of the widths of the conductive material connecting portion 16A and the conductive material connecting portion 16B may change along the extending direction of the connecting terminal 16. For example, the width may monotonically increase from the end portion on the farthest side from the conductive material connecting portion 16A of the conductive material non-connecting portion 16B toward the end portion on the closest side thereof, and the width may monotonically increase from the end portion of the conductive material non-connecting portion 16B side of the conductive material connecting portion 16A toward the end portion on the farthest side from the conductive member non-connecting portion 16B.

In addition, in the above embodiment, the conductive material connecting portion 16A and the conductive material connecting portion 16B are provided along the sealing portion 30A, respectively, but these may be formed so as to extend in the direction away from the sealing portion 30A. However, in this case, it is preferable that the conductive material connecting portion 16A be disposed at the position closer to the sealing portion 30A than the conductive material non-connecting portion 16B. In this case, it is possible to more shorten the conductive material 60P.

Alternatively, in the connecting terminal 16 formed on the transparent conductive layers 12A to 12C, the conductive material non-connecting portion 16B may be disposed so as to be orthogonal to the conductive material connecting portion 16A.

In addition, the width of the conductive material connecting portion 16A is equal to or less than the width of the conductive material non-connecting portion 16B.

In addition, in the above embodiment, the second sealing portion 32A is adhered to the first sealing portion 31A, but the second sealing portion 32A may not be adhered to the first sealing portion 31A.

Furthermore, in the above embodiment, the sealing portion 30A is constituted by the first sealing portion 31A and the second sealing portion 32A, but the second sealing portion 32A may be omitted.

In addition, in the above embodiment, the width P of the adhesive portion of the counter electrode 20 with the partitioning portion 31*b* of the first integrated sealing portion 31 is narrower than the width Q of the adhesive portion of the counter electrode 20 with the annular portion 31*a* of the first integrated sealing portion 31, but the width P of the adhesive portion may be equal to or more than the width Q of the adhesive portion.

Furthermore, in the above embodiment, the width R of the partitioning portion 31*b* of the first integrated sealing portion 31 is 100% or more and less than 200% of the width T of the annular portion 31*a* of the first integrated sealing portion 31, but the width R of the partitioning portion 31*b* may be less than 100% or 200% or more of the width T of the annular portion 31*a* of the first integrated sealing portion 31.

In addition, in the above embodiment, the back sheet 80 is adhered to the transparent conductive layer 12 via the coupling portion 14 made of a glass frit, but the back sheet 80 is not required to be necessarily adhered to the transparent conductive layer 12 via the coupling portion 14.

Furthermore, in the above embodiment, the coupling portion 14 is spaced apart from the insulating material 33, but it is preferable that both of these be constituted by a glass frit and integrated. In this case, the interface between the coupling portion 14 and the insulating material 33 is not present even if moisture penetrates into the space between the back sheet 80 and the conductive substrate 15. In addition, both of the insulating material 33 and the coupling portion 14 are composed of a glass frit and thus have a higher sealing ability compared to a resin. For this reason, it is possible to sufficiently suppress the penetration of moisture through the coupling portion 14 and the insulating material 33.

In addition, in the above embodiment, the insulating material 33 is composed of a glass frit, but the material constituting the insulating material 33 may be one having a higher melting point than the material constituting the first sealing portion 30A. For this reason, examples of such a material may include a thermosetting resin such as a polyimide resin and a thermoplastic resin in addition to a glass frit. Among them, it is preferable to use a thermosetting resin. In this case, even if the sealing portion 30A exhibits fluidity at a high temperature, the insulating material 33 is less likely to be fluidized even at a high temperature compared to the case of being composed of a thermoplastic resin in the same manner as the case of being composed of a glass frit. For this reason, the contact of the conductive substrate 15 with the counter electrode 20 can be sufficiently suppressed, and thus the short circuit between the conductive substrate 15 and the counter electrode 20 can be sufficiently suppressed.

In addition, in the above-described embodiments, the conductive substrate 15 has the insulating material 33. However, the conductive substrate 15 may not have the insulating material 33. In this case, the sealing portion 30A and the first integrated sealing portion 31A are bonded to the transparent substrate 11 and the transparent conductive film 12.

In addition, in the above-described embodiments, the conductive substrate 15 has the connecting terminal 16. However, the conductive substrate may not include the connecting terminal 16.

Moreover, in the above embodiment, the plurality of DSCs 50 are connected in series but may be connected in parallel.

Figure 10:
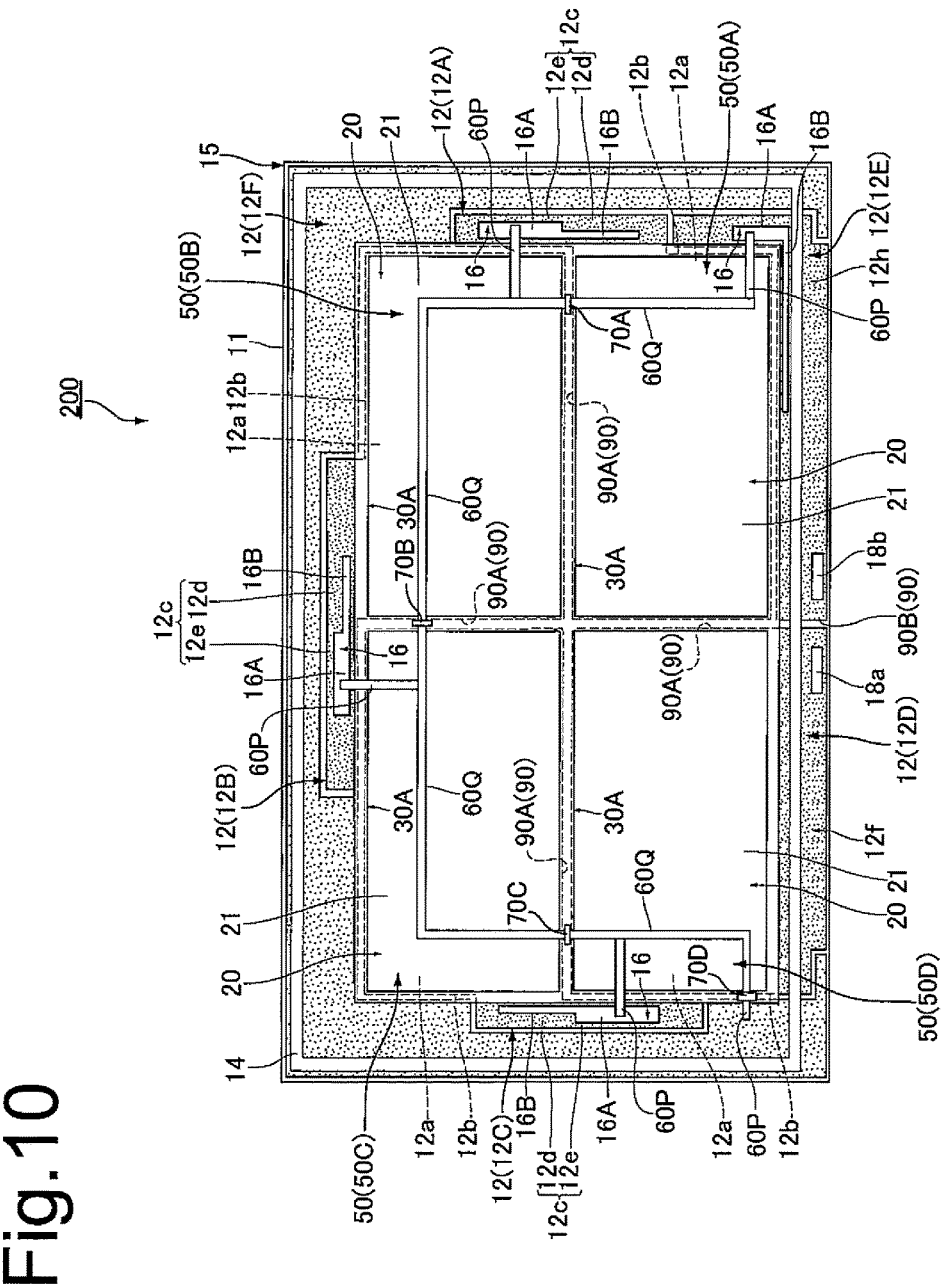
FIG. 10 is a plan view illustrating a part of a second embodiment of the dye-sensitized solar cell element of the invention.

In addition, in the above embodiment, the number of DSCs 50 is four. However, the number of DSCs may be one or more, and it is not limited to four. In this manner, in a case where a plurality of the DSCs 50 are included, it is preferable that the DSCs 50 be arrayed in a fixed direction as illustrated in FIG. 2 rather than a case where some of the DSCs 50A to 50D are folded back in the middle thereof as illustrated in FIG. 10. In this manner, in a case where the DSCs 50 are arrayed in a fixed direction, it is possible to select both an even number and an odd number as the number of the DSC 50 and thus it is possible to freely determine the number of the DSC 50, and it is possible to improve the degree of freedom of the design as a result.

Figure 17:
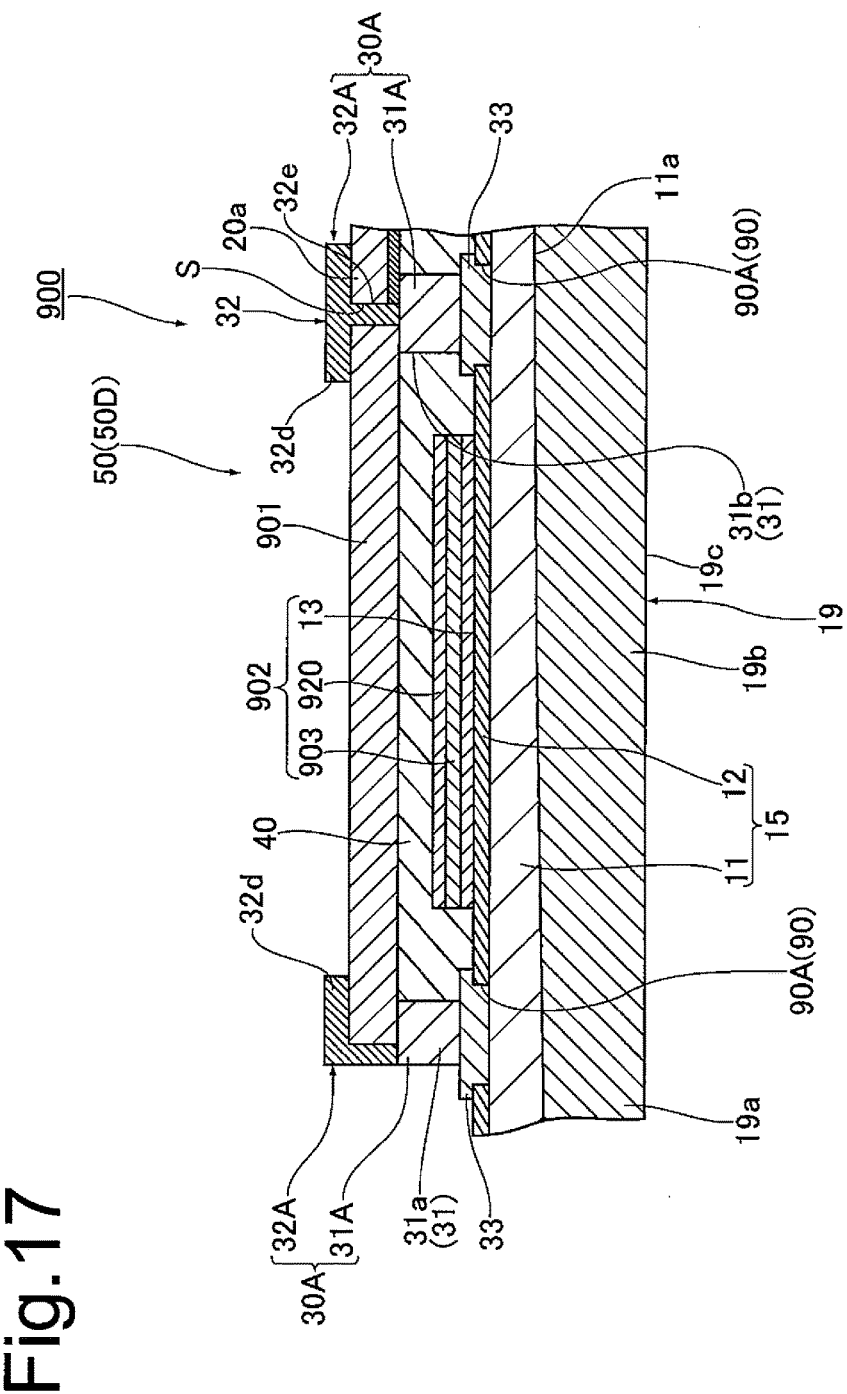
FIG. 17 is a partial end view of the cross section illustrating a ninth embodiment of the dye-sensitized solar cell element of the invention.

Furthermore, in the above embodiment, the counter electrode 20 constitutes the second base material, but an insulating substrate 901 may be used as a counter substrate instead of the counter electrode 20 as a DSC module 900 illustrated in FIG. 17. In this case, a structure 902 is disposed in a space formed by the insulating substrate 901, the sealing portion 31A, and the conductive substrate 15. The structure 902 is provided on the surface of the conductive substrate 15 at the insulating substrate 901 side. The structure 902 is constituted by the oxide semiconductor layer 13, a porous insulating layer 903, and a counter electrode 920 in order from the conductive substrate 15 side. In addition, the electrolyte 40 is disposed in the above space. The electrolyte 40 is impregnated into even the insides of the oxide semiconductor layer 13 and the porous insulating layer 903. Here, for example, a glass substrate or a resin film can be used as the insulating substrate 901. In addition, it is possible to use, as the counter electrode 920, a counter electrode which is the same as the counter electrode 20. Alternatively, the counter electrode 920 may be constituted by, for example, a porous single layer containing carbon or the like. The porous insulating layer 903 is used mainly to prevent the physical contact of the oxide semiconductor layer 13 with the counter electrode 920 and to impregnate the electrolyte 40 into the inside. As such a porous insulating layer 903, for example, a calcined body of an oxide can be used. Incidentally, in the DSC module 900 illustrated in FIG. 17, only one structure 902 is provided in the space formed by the sealing portion 31A, the conductive substrate 15, and the insulating substrate 901, but a plurality of structures 902 may be provided. In addition, the porous insulating layer 903 is provided between the oxide semiconductor layer 13 and the counter electrode 920, but may be provided between the conductive substrate 15 and the counter electrode 920 so as to surround the oxide semiconductor layer 13. With this configuration, it is also possible to prevent the physical contact of the oxide semiconductor layer 13 with the counter electrode 920.

Figure 18:
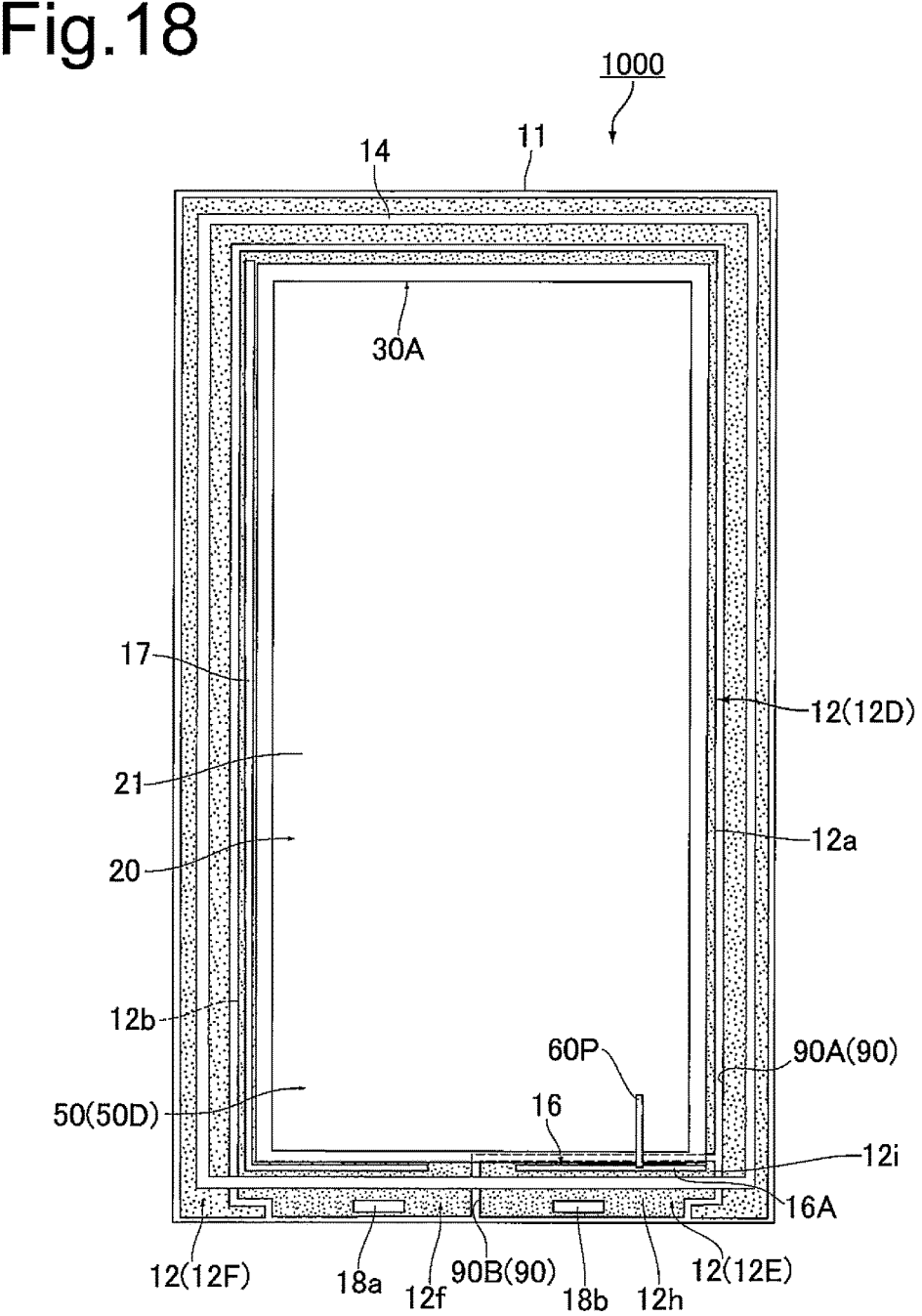
FIG. 18 is a partial end view of the cross section illustrating a tenth embodiment of the dye-sensitized solar cell element of the invention.
Figure 19:
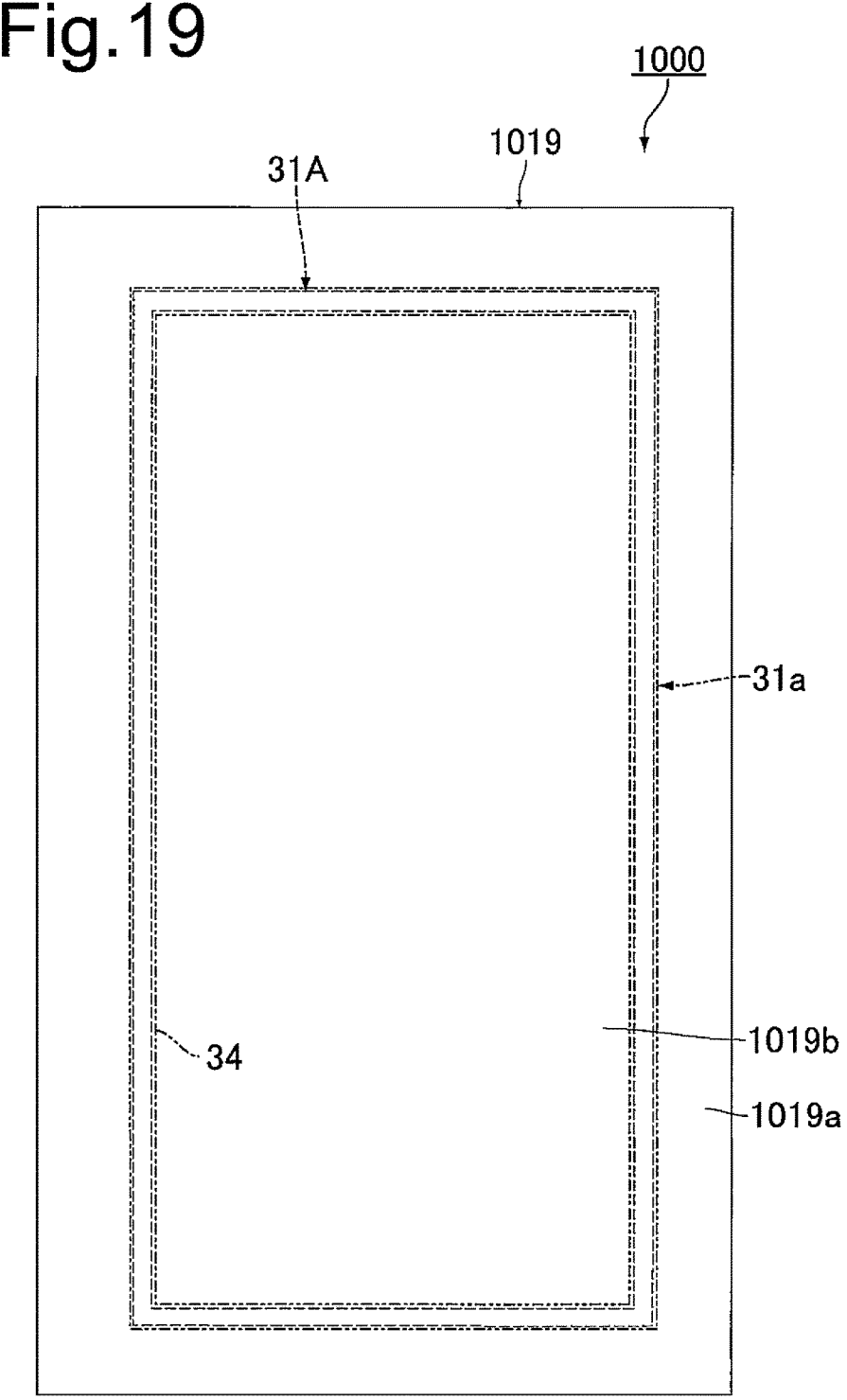
FIG. 19 is a plan view of the dye-sensitized solar cell element of FIG. 18 when viewed from a coating layer.

Further, in the above embodiment, the plurality of DSCs 50 are used, but only one DSC may be used in the invention as in a dye-sensitized solar cell element 1000 illustrated in FIG. 18. Incidentally, in the dye-sensitized solar cell element 1000 illustrated in FIG. 18, the DSC 50A to the DSC 50C in the DSC module 100 are not provided, and the connecting terminal 16 provided on the second current extracting unit 12h and the metal substrate 21 of the counter electrode 20 of the DSC 50D are electrically connected to each other through the conductive material 60P. In addition, in the dye-sensitized solar cell element 1000, the connecting terminal 16 is constituted by only the conductive material connecting portion 16A and this conductive material connecting portion 16A is disposed between the sealing portion 30A and the external connecting terminal 18b. That is, the conductive material connecting portion 16A is not disposed at a position, which faces the side edge portion 12b of the main body portion 12a, of the transparent conductive layer 12D of the DSC 50D. For this reason, it is possible to expand the oxide semiconductor layer 13 to a space at the part at which the conductive material connecting portion 16A is disposed in the DSC module 100 according to the first embodiment. In this case, it is possible to effectively utilize a wasted space and to expand the area for power generation. FIG. 19 is a plan view of the dye-sensitized solar cell element 1000 of FIG. 18 when viewed from a coating layer 1019. As illustrated in FIG. 19, in the dye-sensitized solar cell element 1000, when it is assumed that the inner circumferential surface 34 of the annular portion 31a of the sealing portion 31A extends to pass over the coating layer 1019, an annular portion at the outer side of the inner circumferential surface 34 of the extended annular portion 31a becomes a peripheral portion 1019a of the coating layer 1019 and a portion at the inner side of the annular peripheral portion 1019a becomes a center portion 1019b. Incidentally, in FIG. 19, the dashed line represents the first sealing portion 31A and the two-dot chain line represents the annular portion 31a.

Figure 20:
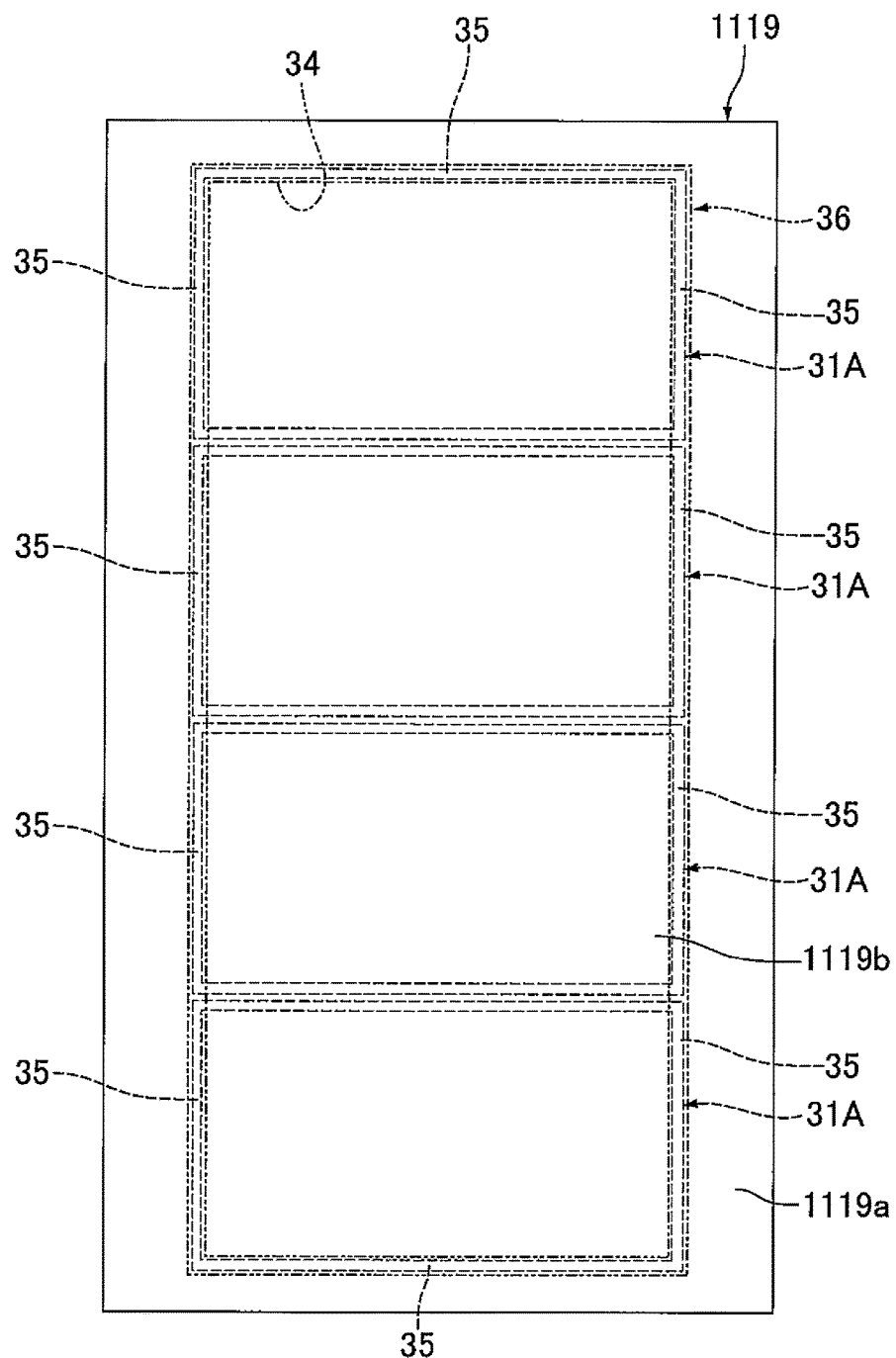
FIG. 20 is a plan view illustrating an eleventh embodiment of the dye-sensitized solar cell element of the invention when viewed from a coating layer.

Furthermore, in the above embodiment, the adjacent sealing portions 31A are integrated with each other, but the adjacent sealing portions 31A may be separated from each other. In this case, as illustrated in FIG. 20, when an annular portion 36 formed by combining portions 35 facing the outer side of each sealing portion 31A of the DSC 50 with each other is assumed and it is assumed that the inner circumferential surface 34 of the annular portion 36 extends to pass over a coating layer 1119 along the thickness direction of the sealing portion 31A, an annular portion at the outer side of the inner circumferential surface 34 of the extended annular portion 36 becomes a peripheral portion 1119a of the coating layer 1119 and a portion at the inner side of the annular peripheral portion 1119a becomes a center portion 1119b. Incidentally, in FIG. 20, the dashed line represents the first sealing portion 31A and the two-dot chain line represents the annular portion 36.

Incidentally, materials constituting the coating layers 1019 and 1119, the same material as that of the coating layer 19 can be used.

EXAMPLES

Hereinafter, the content of the invention will be described more specifically with reference to Examples, but the invention is not limited to the following Examples.

Example 1

First, a parallel plate made of glass having a size of 1 mm×5 cm×10 cm (refractive index: 1.51) was prepared and used as a transparent substrate. Then, a laminate obtained by forming a transparent conductive film made of FTO having a thickness of 1 μm on the transparent substrate was prepared. Subsequently, as illustrated in FIG. 3, grooves 90 were formed on the transparent conductive film 12 by a $CO_2$ laser (V-460 manufactured by Universal Systems, Inc.) so as to form the transparent conductive films 12A to 12F. At this time, the width of the groove 90 was set to 1 mm. Furthermore, each of the transparent conductive films 12A to 12C was formed so as to have a quadrangular main body portion having a size of 4.6 cm×2.0 cm and a protrusion protruding from the side edge portion at one side of the main body portion. In addition, the transparent conductive film 12D was formed so as to have a quadrangular main body portion having a size of 4.6 cm×2.1 cm and a protrusion protruding from the side edge portion at one side of the main body portion. Furthermore, the protruding portions 12c of three transparent conductive films 12A to 12C among the transparent conductive films 12A to 12D were constituted by a projecting portion 12d projecting from the one side edge portion 12b of the main body portion 12a and a facing portion 12e extending from the projecting portion 12d and facing the adjacent main body portion 12a of the transparent conductive film 12. In addition, the protruding portion 12c of the transparent conductive film 12D was constituted by only the projecting portion 12d protruding from the one side edge portion 12b of the main body portion 12a. At this time, the length of the projecting portion 12d in the projecting direction (the direction perpendicular to the X direction of FIG. 2) was set to 2.1 mm, and the width of the projecting portion 12d (the length in the direction along the X direction of FIG. 2) was set to 9.8 mm. In addition, the width of the facing portion 12e (the length in the direction perpendicular to the X direction of FIG. 2) was set to 2.1 mm, and the length of the facing portion 12e in the extending direction (the length in the direction along the X direction of FIG. 2) was set to 9.8 mm.

In addition, the transparent conductive layer 12D was formed so as to have not only the main body portion 12a and the protruding portion 12c but also the first current extracting portion 12f and the connecting portion 12g connecting the first current extracting portion 12f and the main body portion 12a. The transparent conductive layer 12E was formed so as to have the second current extracting portion 12h. At this time, the width of the connecting portion 12g was set to 1.3 mm and the length thereof was set to 59 mm. In addition, when the resistance value of the connecting portion 12g was measured by the four probe method, it was 100Ω. In this manner, a conductive substrate was obtained.

Next, a precursor of the connecting terminal 16 constituted by the conductive material connecting portion 16A and the conductive material non-connecting portion 16B was formed on the protruding portion 12c of the transparent conductive layers 12A to 12C. Specifically, the precursor of the connecting terminal 16 was formed such that a precursor of the conductive material connecting portion 16A was provided on the facing portion 12e and a precursor of the conductive material non-connecting portion 16B was provided on the projecting portion 12d. At this time, the precursor of the conductive material non-connecting portion 16B was formed so as to be narrower than the width of the conductive material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the current collecting wiring 17 was formed on the connecting portion 12g of the transparent conductive layer 12D. The precursor of the current collecting wiring 17 was formed by applying the silver paste by screen printing and drying it.

In addition, precursors of the external connecting terminals 18a and 18b for extracting the current to the outside were formed on the first current extracting portion 12f and the second current extracting portion 12h of the transparent conductive layer 12A, respectively. The precursors of the external connecting terminals were formed by applying the silver paste by screen printing and drying it.

Moreover, a precursor of the insulating material 33 composed of a glass frit was formed so as to enters into the first groove 90A and to cover the edge portion of the main body portion 12a forming the first groove 90A. The insulating material 33 was formed by applying a paste containing a glass frit by screen printing and drying it. At this time, the edge portion of the transparent conductive layer covered with the insulating material 33 was the part between the groove 90 and the position 0.2 mm away from the groove 90.

In addition, in order to fix the back sheet 80, in the same manner as the insulating material 33, a precursor of the annular coupling portion 14 composed of a glass frit was formed so as to surround the insulating material 33 and to pass through the transparent conductive layer 12D, the transparent conductive layer 12E, and the transparent conductive layer 12F. In addition, at this time, the precursor of the coupling portion 14 was formed such that the precursor of the current collecting wiring 17 was disposed on the inner side thereof. In addition, the coupling portion 14 was formed such that the first current extracting portion and the second current extracting portion were disposed on the outer side thereof. The coupling portion 14 was formed by applying a paste containing a glass frit by screen printing and drying it.

Furthermore, a precursor of the oxide semiconductor layer 13 was formed on each of the main body portions 12a of the transparent conductive films 12A to 12D. The precursor of the oxide semiconductor layer 13 was formed by applying a porous oxide semiconductor layer forming paste containing titania ("PST-21NR" manufactured by JGC Catalysts and Chemicals Ltd.) three times by screen printing and then drying the paste, and then by applying a porous oxide semiconductor layer forming paste containing titania ("PST-400C" manufactured by JGC Catalysts and Chemicals Ltd.) by screen printing and then drying the paste.

Next, the precursor of the connecting terminal 16, the precursor of the current collecting wiring 17, the precursors of the external connecting terminals 18a and 18b, the precursor of the insulating material 33, the precursor of the coupling portion 14, the precursor of the insulating material 33, and the precursor of the oxide semiconductor layer 13 were fired at 500° C. for 15 minutes to form the connecting terminal 16, the current collecting wiring 17, the external connecting terminals 18a and 18b, the coupling portion 14, the insulating material 33, and the oxide semiconductor layer 13. In this manner, the working electrode 10 which has the conductive substrate 15 and on which the coupling portion 14 is formed was obtained. At this time, the width of the conductive material connecting portion of the connecting terminal 16 was 1.0 mm and the width of the conductive material non-connecting portion thereof was 0.3 mm. In addition, the length along the extending direction of the conductive material connecting portion was 7.0 mm and the length along the extending direction of the conductive material non-connecting portion was 7.0 mm. In addition, the dimensions of the current collecting wiring 17, the external connecting terminals 18a and 18b, the coupling portion 14, and the oxide semiconductor layer 13 were as follows, respectively.

Current collecting wiring 17: 4 μm in thickness, 200 μm in width, 79 mm in length along the X direction in FIG. 2, and 21 mm in length along the direction orthogonal to the X direction in FIG. 2, External connecting terminals 18a and 18b: 20 μm in thickness, 2 μm in width, and 7 mm in length, Coupling portion 14: 50 μm in thickness, 3 mm in width, and Oxide semiconductor layer 13: 14 μm in thickness, 17 mm in length in the X direction in FIG. 2, and 42.1 mm in length in the direction orthogonal to the X direction in FIG. 2

Next, the working electrode was immersed for 12 hours in a dye solution which contains 0.2 mM of a photosensitizing dye composed of Z907 and uses a mixed solvent obtained by mixing acetonitrile and tert-butanol at a volume ratio of 1:1 as a solvent, and then taken out therefrom and dried, and thus the photosensitizing dye was supported on the oxide semiconductor layer.

Next, iodine ($I_2$), 1,2-dimethyl-n-propylimidazolium iodide (DMPImI), and guanidinium thiocyanate (GuSCN) were added into a solvent composed of 3-methoxypropionitrile (MPN) such that concentrations thereof became 0.002 M, 0.1 M, and 0.6 M, respectively, and the mixture was dissolved under stirring. Thus, an electrolyte was obtained. Then, this electrolyte was applied onto the oxide semiconductor layer and dried, and thereby the electrolyte was disposed. At this time, the amount of the applied electrolyte was set to 31 μL per one DSC.

Next, the first integrated sealing portion forming body for forming the first sealing portion was prepared. The first integrated sealing portion forming body was obtained by preparing one sheet of resin film for sealing which had 8.0 cm×4.6 cm x 50 m and was composed of a maleic anhydride-modified polyethylene (product name: Bynel produced by DuPont) and forming four quadrangular-shaped openings in the resin film for sealing. At this time, the first integrated sealing portion forming body was fabricated such that each opening had a size of 1.7 cm×4.4 cm×50 μm, the width of the annular portion was 2 mm, and the width of the partitioning portion partitioning the inner side opening of the annular portion was 2.6 mm.

Thereafter, the first integrated sealing portion forming body was superimposed on the insulating material 33 constituting the conductive substrate 15 of the working electrode and then the first integrated sealing portion forming body was adhered to the insulating material 33 of the working electrode by heating to melt.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 μm by the sputtering method. The rest two counter electrodes of the four sheets of the counter electrodes were prepared by forming the catalyst layer which had a thickness of 5 nm and was composed of platinum on the titanium foil of 4.6 cm×2.0 cm×40 μm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other. The first integrated sealing portion forming bodies were then melted by heating while applying a pressure to the first integrated sealing portion forming bodies in this state. The first sealing portion was formed between the working electrode and the counter electrode in this manner. At this time, the width P of the adhesive portion of the partitioning portion of the first integrated sealing portion with the surface on the conductive substrate side of the counter electrode, the width Q of the adhesive portion of the annular portion of the first integrated sealing portion with the surface on the conductive substrate side of the counter electrode, the width R of the partitioning portion of the first integrated sealing portion, and the width T of the annular portion thereof were as follows, respectively.

P=1.0 mm
Q=2.0 mm
R=2.6 mm
T=2.2 mm

Next, the second integrated sealing portion was prepared. The second integrated sealing portion was obtained by preparing one sheet of resin film for sealing which had 8.0 cm×4.6 cm×50 μm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.4 cm×50 μm, the width of the annular portion was 2 mm, and the width of the partitioning portion partitioning the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating the first integrated sealing portion and the second integrated sealing portion to melt while pressing the second integrated sealing portion to the counter electrode.

Next, the desiccant sheet was bonded on the metal substrate of each counter electrode with double-sided tape. The dimensions of the desiccant sheet were 1 mm in thickness x 3 cm in length x 1 cm in width, and Zeosheet (trade name, manufactured by Shinagawa Chemicals Co., Ltd.) was used as the desiccant sheet.

Next, as illustrated in FIG. 2, the bypass diodes 70A to 70C were respectively fixed to the three partitioning portions of the second integrated sealing portion by applying the low-temperature curing type silver paste (Dotite D500 manufactured by FUJIKURAKASEI CO., LTD.) so as to continue from the terminals at both ends of the bypass diode to the metal substrate 21 of the counter electrode 20. In addition, the bypass diode 70D was fixed on the annular portion of the second integrated sealing portion of the DSC 50D among the four DSCs 50A to 50D by applying the above low-temperature curing type silver paste so as to continue from one terminal of the terminals at both ends of the diode to the counter electrode. In this manner, the conductive material 60Q was formed so as to link the two adjacent bypass diodes with respect to the four bypass diodes 70A to 70D. At this time, the conductive material 60Q was formed by curing the above low-temperature curing type silver paste at 30° C. for 12 hours. RB751V-40 manufactured by ROHM was used as the bypass diode.

In addition, the conductive material 60P was formed by applying the low-temperature curing type silver paste (Dotite D-500 manufactured by FUJIKURAKASEI CO., LTD.) and curing it so as to connect each of the conductive materials 60Q between the bypass diodes and the conductive material connecting portion on the three transparent conductive layers 12A to 12C, respectively. Moreover, for the bypass diode 70A, the conductive material 60P was formed by applying the above low-temperature curing type silver paste and curing it so as to be connected with the conductive material connecting portion on the transparent conductive layer 12E. At this time, the conductive material 60P was formed by curing the above low-temperature curing type silver paste at 30° C. for 12 hours.

Next, the butyl rubber ("Aikameruto" manufactured by Aica Kogyo Co., Ltd.) was coated on the coupling portion 14 with a dispenser while being heated at 200° C. to form a precursor of the adhesive portion. On the other hand, a laminate, which is obtained by laminating a polybutylene terephthalate (PBT) resin film (50 μm in thickness), aluminum foil (25 μm in thickness), and a film (50 μm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the coupling portion 14. In this manner, the DSC structure was obtained.

Finally, a coating layer forming material was applied onto the light receiving surface of the transparent substrate of the DSC structure by a spin coating method while the DSC structure was rotated. The coating layer forming material was obtained by dissolving a solid content composed of an acrylic resin (trade name: UV-cut coating main agent (PTV-TUA) manufactured by JAPAN NANO COAT CO., LTD.), a thickening polymer composed of ethylene glycol monobutyl ether acetate, and benzotriazole in a solvent composed of isopropyl alcohol and ethanol. Here, the content ratio of benzotriazole in the total mass of the solid content was set to 5% by mass and the content ratio of the thickening polymer in the total mass of the solid content was set to 50% by mass. In addition, at this time, the rotation number of the DSC structure was set to a low rotation number, that is, 1000 rpm. In this way, as illustrated in FIG. 16, the surface of the coated product was formed to be convex toward a side opposite to the transparent substrate and to be a curved surface. In this state, the coated product was subjected to aging for 12 hours in a thermostat bath with a temperature of 80° C., and the solvent was removed from the coated product. In this way, a coating layer having the refractive index n2 of 1.54 was obtained. In this coating layer, the maximum thickness t1 and the average thickness t2 of the peripheral portion were as shown in Table 1, respectively. At this time, the average thickness t2 of the peripheral portion was obtained by mapping the thickness of the peripheral portion using a stylus step profiler. In this way, a DSC module was obtained.

Example 2

A DSC structure was prepared in the same manner as in Example 1. Next, a quadrangular-tube-shaped jig made of stainless steel was fixed to the circumference of the DSC structure. At this time, as the jig, a jig not having a gap between the side surface of the transparent substrate and an inner wall surface of the jig was used. Thereafter, the same coating layer forming material as in Example 1 was allowed to flow into the inner side of the jig, and was applied to the light receiving surface of the transparent substrate. Then, the surface of the coated product was smoothed by a bar coater so as to be flat. Subsequently, the coated product was subjected to aging in the same manner as in Example 1, and the solvent was removed from the coated product. In this way, a pre-coating layer was obtained on the transparent substrate. Next, the jig was detached. Subsequently, the peripheral portion of the pre-coating layer was polished such that the peripheral portion was inclined with respect to the flat surface of the center portion at the inner side of the peripheral portion as illustrated in FIG. 15. In this way, a coating layer having the refractive index n2 of 1.54 was obtained. In this coating layer, the maximum thickness t1 and the average thickness t2 of the peripheral portion were as shown in Table 1, respectively. In this way, a DSC module was prepared.

Example 3

A parallel plate made of glass having a size of 1 mm×5 cm×10 cm (refractive index: 1.51) was prepared. Then, a transparent conductive film made of FTO having a thickness of 1 μm was formed in the same manner as in Example 1. Subsequently, the grooves 90 were formed on the transparent conductive film 12 so as to form the transparent conductive films 12A to 12F. In this way, a laminate was obtained.

Next, after a paste containing the same material as that of the parallel plate was applied onto a surface of the parallel plate in which the transparent conductive films 12A to 12F were not formed, the paste was spin-coated by rotating the laminate at 5000 rpm for 1 minute. Then, after the paste was dried at 150° C. for 1 hour to obtain a dried product, the calcination of the dried product was performed by heating the dried product at 500° C. for 1 hour. In this way, a transparent substrate composed of the dried product after calcination and the parallel plate was obtained so as to obtain a conductive substrate. At this time, the light receiving surface of the transparent substrate had a shape which is convex toward the DSC 50 as illustrated in FIG. 1. A DSC structure was obtained in the same manner as in Example 1, except that the conductive substrate thus obtained was used.

Next, the same coating layer forming material as in Example 1 was applied onto the light receiving surface of the transparent substrate of the DSC structure. Then, the surface of the coated product was smoothed by a bar coater so as to be flat. Subsequently, the coated product was subjected to aging in the same manner as in Example 1, and the solvent was removed from the coated product. In this way, a coating layer having the refractive index n2 of 1.54 was obtained on the transparent substrate. In this coating layer, the maximum thickness t1 and the average thickness t2 of the peripheral portion were as shown in Table 1, respectively. In this manner described above, the DSC module as illustrated in FIG. 1 was obtained.

Example 4

A parallel plate made of glass having a size of 1 mm ×5 cm×10 cm (refractive index: 1.51) was prepared. Then, in the same manner as in Example 1, a transparent conductive film made of FTO having a thickness of 1 µm was formed, the grooves 90 were then formed on the transparent conductive film 12, and thus the transparent conductive films 12A to 12F were formed. In this way, a laminate was obtained.

Next, after a tape made of a polyimide resin having a size of 4.2 cm×8.0 cm was attached to the center portion on one surface of the parallel plate, a paste containing the same material as that of the parallel plate was applied to the tape and a region excluding the tape on one surface of the parallel plate. Then, after the paste was dried at 150° C. for 1 hour to obtain a dried product, the calcination of the dried product was performed by heating the dried product at 500° C. for 1 hour. Then, the dried product after calcination was polished so as to obtain a conductive substrate having a transparent substrate of a shape illustrated in FIG. 13. A DSC module was obtained in the same manner as in Example 1, except that the conductive substrate thus obtained was used. In the obtained DSC module, the refractive index $n_2$ of the coating layer was 1.54. Furthermore, in this coating layer, the maximum thickness $t_1$ and the average thickness $t_2$ of the peripheral portion were as shown in Table 1, respectively.

Example 5

A parallel plate made of glass having a size of 1 mm×5 cm×10 cm (refractive index: 1.51) was prepared. Then, in the same manner as in Example 1, a transparent conductive film made of FTO having a thickness of 1 µm was formed, the grooves 90 were then formed on the transparent conductive film 12, and thus the transparent conductive films 12A to 12F were formed. In this way, a laminate was obtained.

Next, after a paste containing the same material as that of the parallel plate was applied onto a surface of the parallel plate in which the transparent conductive films 12A to 12F were not formed, the paste was spin-coated by rotating the laminate at 5000 rpm for 1 minute. Then, after the paste was dried at 150° C. for 1 hour to obtain a dried product, the calcination of the dried product was performed by heating the dried product at 500° C. for 1 hour. In this way, a transparent substrate composed of the dried product after calcination and the parallel plate was obtained so as to obtain a conductive substrate. At this time, the light receiving surface of the transparent substrate had a shape which is convex toward the DSC 50 as illustrated in FIG. 14. A DSC structure was obtained in the same manner as in Example 1, except that the conductive substrate thus obtained was used.

Next, the same coating layer forming material as in Example 1 was applied by a spin coating method onto the light receiving surface of the transparent substrate of the DSC structure. In this way, the surface of the coated product was formed to be convex toward a side opposite to the transparent substrate and to be a curved surface. In this state, the coated product was subjected to aging in the same manner as in Example 1, and the solvent was removed from the coated product. In this way, a coating layer having the refractive index $n_2$ of 1.54 was obtained. In this coating layer, the maximum thickness $t_1$ and the average thickness $t_2$ of the peripheral portion were as shown in Table 1, respectively. In this manner described above, a DSC module as illustrated in FIG. 14 was prepared.

Comparative Example 1

A DSC module was prepared in the same manner as in Example 1, except that the coating layer was not formed.

The maximum thickness $t_1$ of the coating layer and the average thickness $t_2$ of the peripheral portion thereof were 0 mm as shown in Table 1, respectively.

Comparative Example 2

A DSC module was prepared in the same manner as in Example 1, except that the coating layer was formed on the light receiving surface of the transparent substrate of the DSC structure as follows.

That is, the same coating layer forming material as in Example 1 was applied by a spin coating method onto the light receiving surface of the transparent substrate of the DSC structure while the DSC structure was rotated. In addition, at this time, the rotation number of the DSC structure was set to be high, that is, 5000 rpm. In this way, the surface of the coated product was formed to be convex toward the transparent substrate and to be a curved surface. In this state, the coated product was subjected to aging in the same manner as in Example 1, and the solvent was removed from the coated product. In this way, a coating layer having the refractive index $n_2$ of 1.54 was obtained. In this coating layer, the maximum thickness $t_1$ and the average thickness $t_2$ of the peripheral portion were as shown in Table 1, respectively.

Comparative Example 3

A DSC module was prepared in the same manner as in Example 1, except that, after three sides of the transparent substrate of the DSC structure were surround by a jig made of stainless steel and the light receiving surface of the transparent substrate was tilted at 0.05° with respect to the horizontal plane, the same coating layer forming material as in Example 1 was applied onto the light receiving surface of the transparent substrate. In the obtained DSC module, the refractive index $n_2$ of the coating layer was 1.54. Furthermore, in this coating layer, the maximum thickness $t_1$ and the average thickness $t_2$ of the peripheral portion were as shown in Table 1, respectively.

Comparative Example 4

A DSC structure was prepared in the same manner as in Example 1. Next, a quadrangular-tube-shaped jig made of stainless steel was fixed to the circumference of the DSC structure. At this time, as the jig, a jig not having a gap between the side surface of the transparent substrate and an inner wall surface of the jig was used. Thereafter, the same coating layer forming material as in Example 1 was allowed to flow into the inner side of the jig, and was applied to the light receiving surface of the transparent substrate. Then, the surface of the coated product was smoothed by a bar coater so as to be flat. Subsequently, the coated product was subjected to aging in the same manner as in Example 1, and the solvent was removed from the coated product. In this way, a coating layer was obtained on the transparent substrate. In this manner, the coating layer having the refractive index $n_2$ of 1.54 was obtained. In this coating layer, the maximum thickness $t_1$ and the average thickness $t_2$ of the peripheral portion were as shown in Table 1, respectively. In this mannerdescribed above, a DSC module was prepared.

Comparative Example 5

A DSC module was obtained in the same manner as in Example 1, except that the refractive index $n_2$ of the coating layer was set to 1.51 by using Art Pearl (trade name) manufactured by Negami Chemical Industrial Co., Ltd. as an acrylic resin. Incidentally, in the coating layer of the obtained DSC module, the maximum thickness t1 and the average thickness t2 of the peripheral portion were as shown in Table 1, respectively.

Comparative Example 6

A DSC module was obtained in the same manner as in Example 2, except that the refractive index n2 of the coating layer was set to 1.51 by using Art Pearl (trade name) manufactured by Negami Chemical Industrial Co., Ltd. as an acrylic resin. Incidentally, in the coating layer of the obtained DSC module, the maximum thickness t1 and the average thickness t2 of the peripheral portion were as shown in Table 1, respectively.

Comparative Example 7

A DSC module was obtained in the same manner as in Example 3, except that the refractive index n2 of the coating layer was set to 1.51 by using Art Pearl (trade name) manufactured by Negami Chemical Industrial Co., Ltd. as an acrylic resin. Incidentally, in the coating layer of the obtained DSC module, the maximum thickness t1 and the average thickness t2 of the peripheral portion were as shown in Table 1, respectively.

Comparative Example 8

A DSC module was obtained in the same manner as in Example 4, except that the refractive index n2 of the coating layer was set to 1.51 by using Art Pearl (trade name) manufactured by Negami Chemical Industrial Co., Ltd. as an acrylic resin. Incidentally, in the coating layer of the obtained DSC module, the maximum thickness t1 and the average thickness t2 of the peripheral portion were as shown in Table 1, respectively.

Comparative Example 9

A DSC module was obtained in the same manner as in Example 5, except that the refractive index n2 of the coating layer was set to 1.51 by using Art Pearl (trade name) manufactured by Negami Chemical Industrial Co., Ltd. as an acrylic resin. Incidentally, in the coating layer of the obtained DSC module, the maximum thickness t1 and the average thickness t2 of the peripheral portion were as shown in Table 1, respectively.

(Evaluation of Characteristics)
(Evaluation of Dependence on Light Incident Angle of Photoelectric Conversion Characteristics)

The DSC module obtained in each of Examples 1 to 5 and Comparative Examples 1 to 9 was disposed on the flat surface, the entire DSC module was uniformly irradiated with white light with an illuminance of 200 Lux from a light source, and the photoelectric conversion efficiency at this time was measured. At this time, as the light source, a white LED (product name: LEL-SL5N-F, manufactured by Toshiba Lighting & Technology Corporation) was used. The illuminance was measured using an illuminometer (AS ONE LM-331, manufactured by AS ONE Corporation). Furthermore, each of initial photoelectric conversion efficiencies $\eta_0$ (%), $\eta_{60}$ (%), and $\eta_{80}$ (%) when the incident angle of light was set to 0°, 60°, and 80° was measured, and based on these values, $\eta_{60}/\eta_0$, $\eta_{80}/\eta_0$, and $(\eta_{80}-\eta_{60})/\eta_0$ were calculated. The results thereof are shown in Table 1. Here, the incident angle of light indicates an incident angle of light incident on the flat surface of the DSC module when the DSC module is disposed on the flat surface and the DSC module is irradiated with white light. Incidentally, an acceptable level of the dependence on light incident angle was set as follows.

(Acceptable Level)
$\eta_{60}/\eta_0$ and $\eta_{80}/\eta_0$ each are 0.980 or more and $(\eta_{80}-\eta_{60})/\eta_0$ is 0.001 or less.

(Optical Durability Test)

The DSC module obtained in each of Examples 1 to 5 and Comparative Examples 1 to 9 was continuously irradiated with pseudo solar light (AM 1.5 G) of about 100000 Lux for 500 hours using a continuous light irradiation tester (product name: Light Irradiation Environment Test Equipment, manufactured by IWASAKI ELECTRIC CO., LTD.), and then the photoelectric conversion efficiency $\eta 500$ was measured. Then, the ratio ($\eta 500/\eta 0$) of $\eta 500$ to the initial photoelectric conversion efficiency $\eta 0$ when the light incident angle was set to 0° was calculated. The results thereof are shown in Table 1. Incidentally, $\eta 0$ is the same value as the initial photoelectric conversion efficiency $\eta_0$ (%).

TABLE 1

|  | Refractive index of transparent substrate (n1) | Refractive index of coating layer (n2) | t1 (μm) | t2 (μm) | t1 − t2 (μm) | $\eta_{60}/\eta_0$ | $\eta_{80}/\eta_0$ | $(\eta_{80} - \eta_{60})/\eta_0$ | $\eta 500/\eta 0$ |
|---|---|---|---|---|---|---|---|---|---|
| Example 1 | 1.51 | 1.54 | 22.0 | 8.1 | 13.9 | 0.989 | 0.988 | 0.001 | 0.933 |
| Example 2 | 1.51 | 1.54 | 22.3 | 10.6 | 11.7 | 0.987 | 0.987 | 0.000 | 0.942 |
| Example 3 | 1.51 | 1.54 | 19.8 | 5.4 | 14.4 | 0.991 | 0.990 | 0.001 | 0.910 |
| Example 4 | 1.51 | 1.54 | 20.5 | 6.2 | 14.3 | 0.986 | 0.985 | 0.001 | 0.915 |
| Example 5 | 1.51 | 1.54 | 21.8 | 7.6 | 14.2 | 0.985 | 0.984 | 0.001 | 0.925 |
| Comparative Example 1 | 1.51 | — | — | — | — | 0.986 | 0.980 | 0.006 | 0.000 |
| Comparative Example 2 | 1.51 | 1.54 | 10.4 | 18.5 | −8.1 | 0.930 | 0.926 | 0.004 | 0.776 |
| Comparative Example 3 | 1.51 | 1.54 | 15.4 | 15.4 | 0.0 | 0.915 | 0.910 | 0.005 | 0.847 |
| Comparative Example 4 | 1.51 | 1.54 | 18.4 | 18.4 | 0.0 | 0.942 | 0.940 | 0.002 | 0.851 |
| Comparative Example 5 | 1.51 | 1.51 | 22.1 | 8.5 | 13.6 | 0.952 | 0.948 | 0.004 | 0.935 |
| Comparative Example 6 | 1.51 | 1.51 | 21.9 | 10.2 | 11.7 | 0.951 | 0.945 | 0.006 | 0.915 |

TABLE 1-continued

|  | Refractive index of transparent substrate (n1) | Refractive index of coating layer (n2) | t1 (μm) | t2 (μm) | t1 − t2 (μm) | $\eta_{60}/\eta_0$ | $\eta_{80}/\eta_0$ | $(\eta_{80} - \eta_{60})/\eta_0$ | $\eta 500/\eta 0$ |
|---|---|---|---|---|---|---|---|---|---|
| Comparative Example 7 | 1.51 | 1.51 | 21.3 | 5.4 | 15.9 | 0.954 | 0.951 | 0.003 | 0.919 |
| Comparative Example 8 | 1.51 | 1.51 | 21.5 | 7.0 | 14.5 | 0.947 | 0.929 | 0.018 | 0.918 |
| Comparative Example 9 | 1.51 | 1.51 | 25.2 | 10.4 | 14.8 | 0.945 | 0.941 | 0.004 | 0.924 |

As shown in Table 1, it was found that all of the DSC modules of Examples 1 to 5 achieved an acceptable level with respect to dependence on light incident angle of photoelectric conversion characteristics; on the other hand, all of the DSC modules of Comparative Examples 1 to 9 did not achieve an acceptable level with respect to dependence on light incident angle of photoelectric conversion characteristics.

As described above, according to the DSC module of the invention, it was found that it is possible to sufficiently decrease dependence on light incident angle of photoelectric conversion characteristics.

EXPLANATIONS OF LETTERS OR NUMERALS

11 TRANSPARENT SUBSTRATE
11a LIGHT RECEIVING SURFACE
13 OXIDE SEMICONDUCTOR LAYER
15 CONDUCTIVE SUBSTRATE (FIRST BASE MATERIAL, FIRST ELECTRODE)
19, 519, 619, 719, 819, 1019, 1119 COATING LAYER
19a, 519a, 619a, 719a, 819a, 1019a, 1119a PERIPHERAL PORTION
19b, 519b, 619b, 719b, 819b, 1019b, 1119b CENTER PORTION
20, 920 COUNTER ELECTRODE (SECOND BASE MATERIAL, SECOND ELECTRODE)
30A SEALING PORTION
34 INNER CIRCUMFERENTIAL SURFACE OF SEALING PORTION
50, 50A to 50D DYE-SENSITIZED SOLAR CELL
100 TO 1000 DYE-SENSITIZED SOLAR CELL MODULE (DYE-SENSITIZED SOLAR CELL ELEMENT)
901 INSULATING SUBSTRATE (SECOND BASE MATERIAL)

The invention claimed is:

1. A dye-sensitized solar cell element comprising at least one dye-sensitized solar cell and a single transparent substrate,
the at least one dye-sensitized solar cell including:
a first base material comprising the transparent substrate;
a second base material facing the first base material;
an oxide semiconductor layer provided between the first base material and the second base material; and
an annular sealing portion connecting the first base material and the second base material,
a coating layer being provided on the first base material, the coating layer being capable of transmitting light, and
the transparent substrate including a light receiving surface which faces the coating layer,
the coating layer covering the light receiving surface of the transparent substrate,
the coating layer including:
an annular peripheral portion; and
a center portion provided at the inner side of the peripheral portion, wherein
an average thickness of the peripheral portion is smaller than a maximum thickness of the center portion,
the coating layer has a refractive index higher than a refractive index of the transparent substrate; wherein
the entire transparent substrate is curved to be convex toward a side opposite to the coating layer,
and wherein,
in a case where the dye-sensitized solar cell element comprises one dye-sensitized solar cell, the peripheral portion of the coating layer is a portion of the coating layer extending outward in a circumferential direction from an inner circumference of the annular sealing portion,
in a case where the dye-sensitized solar cell element comprises a plurality of the dye-sensitized solar cells, the sealing portions of the adjacent dye-sensitized solar cells are integrated with each other to form an integrated sealing portion, and the integrated sealing portion has an outer annular portion, the peripheral portion of the coating layer is a portion of the coating layer extending outward in a circumferential direction from an inner circumference of the outer annular portion of the integrated sealing portion, or
in a case where the dye-sensitized solar cell element comprises a plurality of the dye-sensitized solar cells, the sealing portions of the adjacent dye-sensitized solar cells are separated from each other, and an annular border is defined by combining inner circumferential edges of all of the sealing portions, the peripheral portion of the coating layer is a portion of the coating layer extending outward in a circumferential direction from the annular border.

2. The dye-sensitized solar cell element according to claim 1, wherein a surface, which is opposite to the transparent substrate, of surfaces of the coating layer is a flat surface.

3. The dye-sensitized solar cell element according to claim 1, wherein the transparent substrate is composed of glass, polyethylene terephthalate, polyethylene naphthalate, polycarbonate or polyethersulfone.

4. The dye-sensitized solar cell element according to claim 1, wherein the transparent substrate is composed of polycarbonate.

* * * * *